United States Patent
Kwok et al.

(10) Patent No.: US 12,530,954 B2
(45) Date of Patent: Jan. 20, 2026

(54) SYSTEM, METHOD AND SMART WEARABLE DEVICE FOR USER POSTURE MONITORING

(71) Applicant: SOLOS TECHNOLOGY (SHENZHEN) LIMITED, Guangdong (CN)

(72) Inventors: Kei Kwok, Guangdong (CN); Kwok Wah Law, Guangdong (CN); Chi Sum Yu, Guangdong (CN); Wai Kuen Cheung, Guangdong (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 197 days.

(21) Appl. No.: 18/605,879

(22) Filed: Mar. 15, 2024

(65) Prior Publication Data

US 2024/0221482 A1 Jul. 4, 2024

Related U.S. Application Data

(63) Continuation of application No. PCT/CN2022/117688, filed on Sep. 8, 2022.

(30) Foreign Application Priority Data

Sep. 15, 2021 (CN) .......................... 202111081377.0

(51) Int. Cl.
*G08B 21/04* (2006.01)
(52) U.S. Cl.
CPC ................................ *G08B 21/0446* (2013.01)
(58) Field of Classification Search
CPC .......... G08B 21/0446; A61B 5/00; A61B 5/11
See application file for complete search history.

(56) References Cited

U.S. PATENT DOCUMENTS 6,461,297 B1 * 10/2002 Pagnacco ............. A61B 5/6814
600/300
9,196,175 B2 * 11/2015 Walsh .................. A61B 5/4561
(Continued)

FOREIGN PATENT DOCUMENTS

| CN | 105872871 A | 8/2016 |
| CN | 106933358 A | 7/2017 |

(Continued)

OTHER PUBLICATIONS

International Search Report and Written opinion of PCT Patent Application No. PCT/CN2022/117688 issued on Nov. 29, 2022 and English translation thereof.

*Primary Examiner* — Curtis J King

(57) ABSTRACT

A system, method, and smart wearable device for user posture monitoring are provided, which are related to the technical field of data processing. The system comprises a smart wearable device and a monitoring terminal. The smart wearable device is equipped with motion sensor(s) and a wireless communication device. The smart wearable obtains real-time posture data of the user's head through the motion sensor(s) and transmits the posture data to the monitoring terminal using the wireless communication device. The monitoring terminal receives the posture data, monitors whether the user suffers from a head disease and/or a neck-shoulder disease based on the posture data, and outputs a reminder message when the user is identified as having the head disease and/or the neck-shoulder disease. This application enables the analysis and provision of reminders for the user's head disease and/or neck-shoulder disease based on monitoring the posture of the user's head.

36 Claims, 11 Drawing Sheets

(56) References Cited

U.S. PATENT DOCUMENTS

| | | | |
|---|---|---|---|
| 11,759,125 B2* | 9/2023 | Ladd | G09B 5/02 |
| | | | 434/247 |
| 2009/0324024 A1* | 12/2009 | Worthington | G06V 40/161 |
| | | | 382/118 |
| 2015/0065919 A1* | 3/2015 | Cuevas | A61B 5/746 |
| | | | 600/587 |
| 2016/0110986 A1* | 4/2016 | Rosenblood | A61B 5/4561 |
| | | | 340/573.7 |
| 2016/0260309 A1* | 9/2016 | Dayal | G09B 21/008 |
| 2018/0108238 A1* | 4/2018 | Chen | A42B 3/046 |
| 2018/0192798 A1* | 7/2018 | Song | F04D 29/602 |
| 2018/0233018 A1* | 8/2018 | Burwinkel | A61B 5/0002 |
| 2019/0216341 A1* | 7/2019 | Bae | A61B 5/1116 |
| 2020/0196045 A1* | 6/2020 | Tamir | G08B 5/22 |
| 2024/0266053 A1* | 8/2024 | Ikemoto | G16H 20/00 |
| 2025/0152396 A1* | 5/2025 | Kim | A61F 5/024 |
| 2025/0205101 A1* | 6/2025 | Park | A61H 1/0222 |

FOREIGN PATENT DOCUMENTS

| | | |
|---|---|---|
| CN | 109498026 A | 3/2019 |
| CN | 109938739 A | 6/2019 |

\* cited by examiner

Posture of head in healthy state    Posture of head with cervical spondylosis

ND SMART
SYSTEM, METHOD AND SMART WEARABLE DEVICE FOR USER POSTURE MONITORING

CROSS REFERENCE TO RELATED APPLICATIONS

The present application is a Continuation Application of PCT Application No. PCT/CN2022/117688, filed on Sep. 8, 2022, which claims the priority of Chinese Patent Application No. 2021110813770, titled "SYSTEM, METHOD AND SMART WEARABLE DEVICE FOR USER POSTURE MONITORING", filed on Sep. 15, 2021, the entire contents of which are hereby incorporated by reference.

BACKGROUND

1. Technical Field

The present disclosure relates to the technical field of data processing, and particularly to a system for user posture monitoring, a method for user posture monitoring, and smart wearable device.

2. Description of Related Art

With the advancement of technology leading to improving convenience in people's lives in recent years, more and more people are accustomed to using computers, mobile phones, tablets for office, reading, entertainment, etc., but maintaining a posture for a long time may cause musculoskeletal pain in the neck, back, and shoulders. This is especially true for office workers who spend most of their days sitting at their workstations in the office. The pain could be exacerbated if the worker exhibits bad posture while sitting, such as prolonged downward gaze because such posture puts pressure on the neck and shoulder muscles.

If the user maintains a bad posture for a long time, it is necessary to remind the user to correct the posture. However, in practice, some chronic or acute symptoms or diseases may also be the cause of the person's slanted head or neck position. In such cases, if the user is only simply reminded for correcting the bad posture without considering the underlying diseases, the user may not be able to effectively correct the bad posture due to his/her own limitations caused by the diseases. Moreover, the user may overlook his/her own symptoms, leading to greater hidden risks for user's health.

SUMMARY

The present disclosure provides a system for user posture monitoring, a method for user posture monitoring, and smart wearable device, which aim to analyze whether a user suffers from a head disease and/or a neck-shoulder disease and remind by the real-time monitoring of head posture of the user.

An embodiment of the present disclosure provides a system for user posture monitoring, including: a smart wearable device and a monitoring terminal, wherein the smart wearable device is equipped with at least one motion sensor and a wireless communication device;
the smart wearable device is configured for: obtaining, by the at least one motion sensor, posture data of a head of a user in real time, and transmitting, by the wireless communication device, the posture data to the monitoring terminal; and
the monitoring terminal is configured for: receiving the posture data transmitted by the smart wearable device, monitoring whether the user suffers from a head disease and/or a neck-shoulder disease based on the posture data, and in response to a detection of the user suffering from the head disease and/or the neck-shoulder disease, outputting a reminder message based on a preset reminder manner.

An embodiment of the present disclosure provides a smart wearable device, including: a processor, a memory, at least one motion sensor and a wireless communication device, wherein the memory, the at least one motion sensor and the wireless communication device are electrically coupled to the processor;
computer codes executable on the processor are stored on the memory, and when the computer codes are executed by the processor, the processor performs the following steps:
obtaining, by the at least one motion sensor, posture data of a head of a user in real time;
transmitting, by the wireless communication device, the posture data to a monitoring terminal or a cloud server; and
monitoring whether the user suffers from a head disease and/or a neck-shoulder disease based on the posture data, and in response to a detection of the user suffering from the head disease and/or the neck-shoulder disease, outputting a reminder message based on a preset reminder manner.

An embodiment of the present disclosure provides a method for user posture monitoring, including:
obtaining, by a smart wearable device, posture data of a head of a user in real time using at least one motion sensor, and transmitting the posture data to a monitoring terminal; and
monitoring, by the monitoring terminal, whether the user suffers from a head disease and/or a neck-shoulder disease based on the posture data, and in response to a detection of the user suffering from the head disease and/or the neck-shoulder disease, outputting a reminder message based on a preset reminder manner.

Compared with the prior art, the present disclosure has the following beneficial effects: by the smart wearable device obtaining the posture data of the head of the user in real time and transmitting the posture data to the monitoring terminal, and the monitoring terminal analyzing the received posture data, the analysis and reminder for the user's head disease and/or neck-shoulder disease based on the user head posture monitoring are realized, so that the user can be helped to discover the hidden dangers of health in time and correct the discovered hidden dangers.

DETAILED DESCRIPTION

In order to make the objects, features and advantages of the present disclosure more obvious and easier to understand, the technical solutions in this embodiment will be clearly and completely described below with reference to the drawings. It should be understood that the specific embodiments described here are only intended to explain the present application and are not intended to limit the present application.

Figure 1:
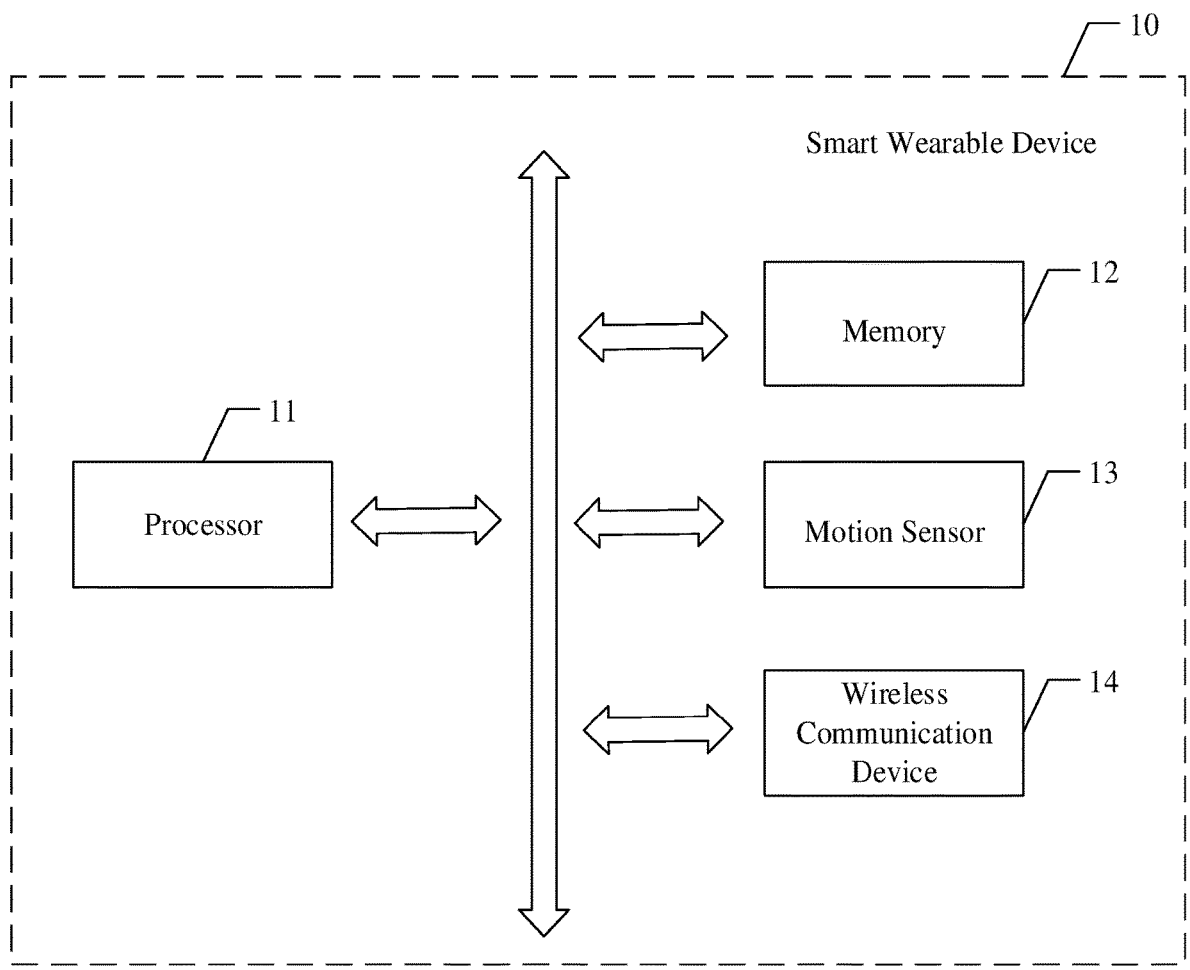
FIG. 1 is a schematic structure diagram of a smart wearable device according to one embodiment of the present disclosure.

Referring to FIG. 1, a schematic structure diagram of a smart wearable device according to one embodiment of the present disclosure. For ease of understanding, only part of the structure is shown in FIG. 1. In practical applications, the smart wearable device may have more structures than those shown in FIG. 1. As shown in FIG. 1, the smart wearable device 10 includes: a processor 11, a memory 12, at least one motion sensor 13 and a wireless communication device 14. The memory 12, the at least one motion sensor 13 and the wireless communication device 14 are electrically coupled to the processor 11.

The wireless communication device 14 may be, for example, a wireless transceiver, and the wireless transceiver performs the data interaction with external devices based on any one of wireless communication protocols such as Bluetooth, WIFI, ZigBee, 2G/3G/4G/5G cellular, etc.

Computer codes executable on the processor 11 are stored on the memory 12, and when the computer codes are executed by the processor 11, the processor 11 performs the following steps:

obtaining, by the at least one motion sensor 13, posture data of a head of a user in real time;

transmitting, by the wireless communication device 14, the obtained posture data to a monitoring terminal or a cloud server; and monitoring whether the user suffers from a head disease and/or a neck-shoulder disease based on the posture data, and in response to a detection of the user suffering from the head disease and/or the neck-shoulder disease, outputting a reminder message based on a preset reminder manner.

In one embodiment, the steps further include:

comparing the posture data with a preset angle range, and in response to a time duration of the posture data being outside the preset angle range being longer than a preset duration, notifying the user to correct a bad posture based on the preset notifying manner.

Figure 2:
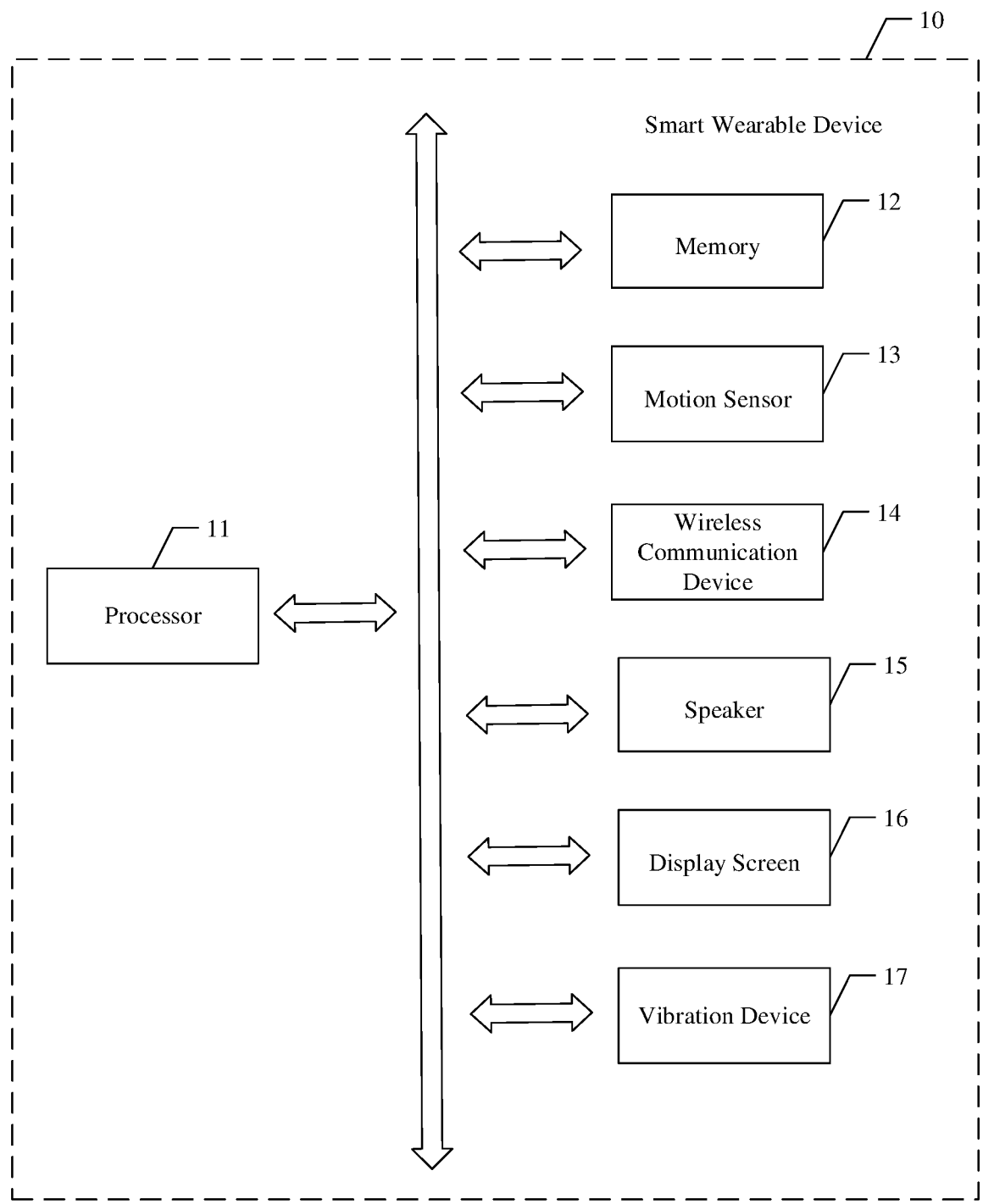
FIG. 2 is a schematic structure diagram of the smart wearable device according to another embodiment of the present disclosure.

Optionally, as shown in FIG. 2, the smart wearable device 10 further includes at least one of: speaker(s) 15, a display screen 16 and a vibration device 17 (such as, a micro vibration motor), which are electrically coupled with the processor 11. The preset notifying manner may include, but is not limited to at least one of: outputting a notifying voice by the speaker(s) 15, displaying notifying text(s) or animation(s) on the display screen 16, and vibrating through the vibration device 17.

Specifically, the processor 11 may be electrically coupled with the memory 12, the at least one motion sensor 13, the wireless communication device 14, the speaker(s) 15, the display screen 16 and the vibration device 17 via a bus.

Optionally, the at least one motion sensor 13 includes a 9-axis motion sensor, such as a 9-axis IMU (Inertial Measurement Unit) including a three-axis accelerometer, a three-axis gyroscope and a three-axis magnetometer.

In one embodiment, the step of obtaining, by the at least one motion sensor 13, the posture data of the head of the user in real time specifically includes: obtaining raw sensing data of the at least one motion sensor 13 in real time, and converting the raw sensing data into the posture data using a quaternion algorithm or an arctangent function.

In one embodiment, the posture data includes: yaw angles, pitch angles and roll angles. Optionally, at least one corresponding angular range is set for each type of the posture data.

In one embodiment, the step of comparing the posture data with the preset angle range, and in response to the time duration of the posture data being outside the preset angle range being longer than the preset duration, notifying the user to correct the bad posture based on the preset notifying manner specifically includes: respectively comparing the yaw angles, the pitch angles and the roll angles with corresponding angle ranges of the yaw angles, the pitch angles and the roll angles; and in response to a time duration of some or all of the yaw angles, the pitch angles and the roll angles being outside the corresponding angle ranges being longer than the preset duration, notifying the user to correct the bad posture based on the preset notifying manner.

Optionally, the display screen 16 may be a touch screen, the step of outputting the reminder message based on the preset reminder manner includes:

displaying a message for reminding the user to seek medical attention on the touch screen; or sending, by the wireless communication device 14 a message to a designated third-party terminal for reminding of a wearer of the smart wearable device needing the medical attention.

In one embodiment, when the computer codes are executed, the processor 11 further performs the following steps:

counting, in real time, a first time duration of the posture data falling into different preset threshold ranges within a preset real-time health monitoring period, and a second time duration of the posture data falling into the different preset threshold ranges within each of first preset time periods of the preset real-time health monitoring period, wherein the different preset threshold ranges indicate different health levels;

generating a first posture monitoring graph of the user based on the first time duration, generating a second posture monitoring graph of the user based on the second time duration, and displaying the first posture monitoring graph and the second posture monitoring graph on the touch screen, wherein the first posture monitoring graph is used for representing a distribution of postures with the different health levels of the user within the preset real-time health monitoring period, and the second posture monitoring graph is used for representing a distribution of the postures with the different health levels of the user within each of the first preset time periods of the preset real-time health monitoring period. Optionally, the first posture monitoring graph is a doughnut chart, and the second posture monitoring graph is a histogram.

Optionally, in one embodiment, when the computer codes are executed, the processor 11 further performs the following steps:

in response to the detection of the user suffering from the head disease and/or the neck-shoulder disease, monitoring a recovery state of the user in real time, and counting a third time duration of the user wearing the smart wearable device 10 within each of second preset time periods of a preset recovery state monitoring period;

comparing the posture data with a preset target value, obtaining a ratio of a fourth time duration of the posture data reaching the target value to a time duration of each of the second preset time periods within each of the second preset time periods, and determining a recovery trend based on the ratio and a difference between the posture data and the preset target value, wherein recovery trends include: maintaining, improving and declining;

generating a device wear time graph based on the third time duration;

generating a posture recovery state graph based on the fourth time duration; and displaying the device wear time graph and the posture recovery state graph on the touch screen, wherein the posture recovery state graph includes: the ratio, a preset target ratio, and description information of the recovery trend.

Optionally, in one embodiment, when the computer codes are executed, the processor 11 further performs the following steps:

transmitting posture data obtained during the preset recovery state monitoring period to a designated medical institution.

Optionally, in one embodiment, when the computer codes are executed, the processor 11 further performs the following steps:

rating and scoring at least one posture of head and/or neck-shoulder of the user within each of preset third time periods of a preset posture rating period based on the posture data obtained in real time, preset standard posture data and a preset rating standard, and obtaining rating results and scoring results;

generating a rating graph based on the rating results, and generating a score changes graph based on the scoring results and a preset target score; and displaying the rating graph and the score changes graph on the touch screen.

Optionally, the score changes graph includes a score changes curve graph.

Optionally, in one embodiment, when the computer codes are executed, the processor 11 further performs the following steps:

in response to a preset action performed by the user on the touch screen, performing at least one action corresponding to the preset action, wherein the at least one action corresponding to the preset action includes at least one of: setting the preset duration and/or the preset angle range, controlling to turn on or off a posture monitoring, setting the preset target ratio, setting the reminder manner, setting the preset real-time health monitoring period, setting the preset recovery state monitoring period, setting the preset posture rating period, and setting a volume of the notifying voice.

Optionally, in one embodiment, when the computer codes are executed, the processor 11 further performs the following steps:

transmitting monitoring data to a cloud server, wherein the monitoring data may include, but is not limited to, the raw sensing data, the posture data and account information of the user.

Further, in one embodiment, the step of monitoring whether the user suffers from the head disease and/or the neck-shoulder disease based on the posture data specifically includes:

in response to the smart wearable device 10 being offline, monitoring whether the user suffers from the head disease and/or the neck-shoulder disease based on the posture data and a locally stored posture classification model, and determining a category of a disease of the user;

in response to the smart wearable device 10 being online, obtaining, by the wireless communication device 14, a posture classification model from the cloud server, storing the obtained posture classification model on the memory 12, monitoring whether the user suffers from the head disease and/or the neck-shoulder disease based on the posture data and the obtained posture classification model, and determining the category of the disease of the user; and obtaining exercise reminder information based on the category, wherein the posture classification model is obtained by the cloud server using the supervised learning algorithm or the unsupervised learning algorithm.

The preset reminder manner includes: outputting the exercise reminder information based on a preset output manner.

Optionally, in one embodiment, the smart wearable device 10 further includes: a laser projection device, and the processor 11 may project the above-mentioned first posture monitoring graph, second posture monitoring graph, device wear time graph, posture recovery state graph, rating graph and score changes graph onto the retina of the user through the laser projection device.

Optionally, in one embodiment, when the smart wearable device 10 is online and connected to the monitoring terminal, the smart wearable device 10 transmits the posture data obtained in real time to the monitoring terminal, and the monitoring terminal counts and analyzes the posture data, and generates the above-mentioned graphs.

In one embodiment, when the computer codes are executed, the processor 11 further performs the following steps:

in response to receiving, through the wireless communication device 14, at least one graph transmitted by the monitoring terminal, projecting, by the laser projection device, the received at least one graph onto the retina of the user, wherein the at least one graph includes at least one of the first posture monitoring graph, the second posture monitoring graph, the device wear time graph, the posture recovery state graph, the rating graph and the score changes graph.

That is, the above-mentioned first posture monitoring graph, second posture monitoring graph, device wear time graph, posture recovery state graph, rating graph and score changes graph may be generated by the monitoring terminal based on the posture data transmitted by the smart wearable device 10, and transmitted back to the smart wearable device 10 by the monitoring terminal. By using the monitoring terminal to generate various graphs, the calculation amount of the processor 11 can be reduced, the data processing speed can be improved, and the hardware cost of the smart wearable device 10 can be reduced.

The smart wearable device provided in the aforementioned embodiments, by obtaining the posture data of the head of the user in real time and analyzing the posture data obtained in real time, enables the analysis and provision of reminders for the user's head disease and/or neck-shoulder disease based on monitoring the posture of the user's head, so that the user can be helped to discover the hidden dangers of health in time and correct the discovered hidden dangers.

Figure 3:
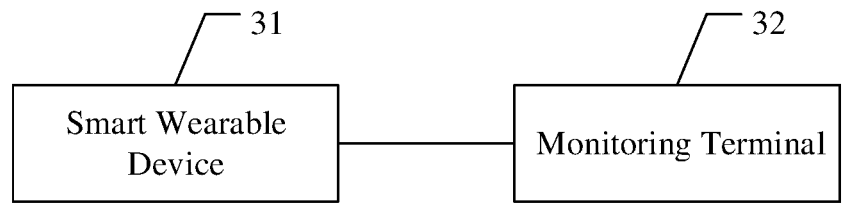
FIG. 3 is a schematic structure diagram of a system for user posture monitoring according to one embodiment of the present disclosure.

Referring to FIG. 3, a schematic structure diagram of a system for user posture monitoring according to one embodiment of the present disclosure. As shown in FIG. 3, the system for user posture monitoring 30 includes a smart wearable device 31 and a monitoring terminal 32. The structure of the smart wearable device 31 may be as shown in FIGS. 1 and 2. The specific form of the smart wearable device 31 may include, but is not limited to, smart wearable devices wearable on the head of the user, such as smart glasses, smart earrings, smart hair bands, smart earphones, and the like. The monitoring terminal 32 may include, but is not limited to: a cellular phone, a smartphone, a personal digital assistant, a media player, a media recorder, a smart radio, a laptop computer, a personal digital assistant (PDA), a portable multimedia player (PMP), a moving picture experts group (MPEG-1 or MPEG-2) audio layer 3 (MP3) player, a digital camera, a desktop computer, and the like.

Figure 4:
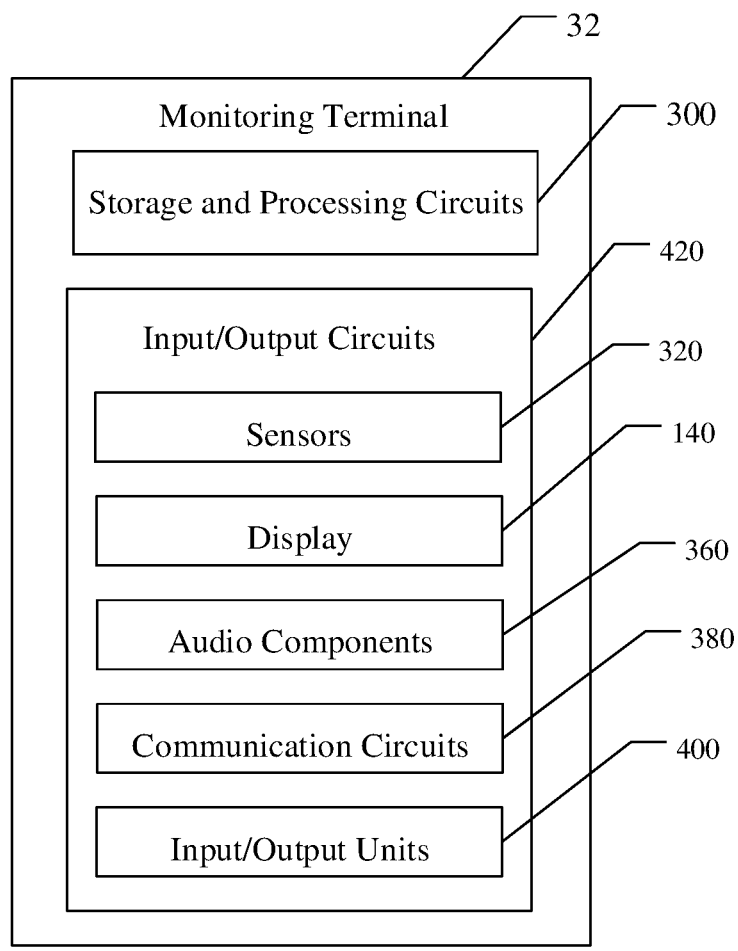
FIG. 4 is a schematic structure diagram of a monitoring terminal in the system for user posture monitoring shown in FIG. 3.

As shown in FIG. 4, the monitoring terminal 32 may include control circuits, which may include storage and processing circuits 300. The storage and processing circuits 300 may include a memory such as a hard disk drive memory, a non-volatile memory (e.g., a flash memory or other electrically erasable programmable read only memory used to form solid state drives, etc.), a volatile memory (e.g., a static or dynamic random-access memory, etc.), and the like, which is not limited by the embodiments of the present disclosure. The processing circuits in the storage and processing circuits 300 may be used to control the operation of monitoring terminal 32. The processing circuits can be implemented based on one or more microprocessors, microcontrollers, digital signal processors, baseband processors, power management units, audio codec chips, application specific integrated circuits, display driver integrated circuits, etc.

The storage and processing circuits 300 can be used to run one or more software on the monitoring terminal 32, such as, AI (artificial intelligence) housekeeper APP (application), Internet browsing APP, VOIP (Voice over Internet Protocol) phone calling APP, E-mail APP, media playback APP, operating system, etc. The software can be used to perform control actions, such as, data processing and analysis of motion data transmitted by the smart glasses 301 based on preset analysis algorithms, image capture based on the camera, measurement of ambient light based on the ambient light sensor, proximity sensor measurement based on the proximity sensor, displaying information based on the status indicator such as a status pilot lamp based on light emitting diode (LED), touch event detection based on the touch sensor, actions associated with displaying information on multiple (e.g., layered) displays, actions associated with performing wireless communication, actions associated with collecting and producing audio signals, control actions associated with collecting and processing of button press event data, and other actions on the monitoring terminal 32, which are not limited by the embodiments of the present disclosure.

Further, in one embodiment, the memory stores executable program codes. A processor coupled to the memory calls the executable program codes stored on the memory, and performs the relevant steps in the following method embodiments of the present disclosure, to implement various functions of the monitoring terminal 32 in each embodiment of the present disclosure.

The monitoring terminal 32 may further include input/output circuits 420. The input/output circuits 420 may be used to enable the monitoring terminal 32 to input and output data. That is, the monitoring terminal 32 is allowed to receive data from one or more external devices and further allowed to output data from the monitoring terminal 32 to the one or more external devices. The input/output circuits 420 may further include sensors 320. The sensors 320 may include an ambient light sensor, a light-based and capacitive-based proximity sensor, a touch sensor (such as, a light-based touch sensor and/or a capacitive touch sensor, where the touch sensor may be part of a touch screen or may be used independently as a touch sensor), an accelerometer, and other sensors.

The input/output circuits 420 may further include one or more displays, for example, the display 140. The display 140 may include any one or any combination of a liquid crystal display, an organic LED display, an electronic ink display, a plasma display, and displays using other display technologies. The display 140 may include a touch sensor array (i.e., the display 140 may be a touch screen). The touch sensor may be a capacitive touch sensor formed by an array of transparent touch sensor electrodes (such as, indium tin oxide (ITO) electrodes), or may be a touch sensor formed using other touch technologies, such as, sonic touch, pressure-sensitive touch, resistive touch, optical touch, etc., which is not limited by the embodiments of the present disclosure.

The monitoring terminal 32 may further include audio components 360. The audio components 360 may be used to provide audio input and output functions for monitoring terminal 32. The audio components 360 in the monitoring terminal 32 may include speaker(s), audio pickup device(s), buzzer(s), tone generator(s), and other components for generating and detecting sound.

The communication circuits 380 may be used to provide the monitoring terminal 32 with the ability to communicate with the external devices. The communication circuits 380 may include analog and digital input/output interface circuits, and wireless communication circuits based on radio frequency signals and/or optical signals. The wireless communication circuits in the communication circuits 380 may include radio frequency transceiver circuits, power amplifier circuits, low noise amplifiers, switches, filters, and antennas. For example, the wireless communication circuits in the communication circuits 380 may include circuits for supporting Near Field Communication (NFC) by transmitting and receiving near field coupled electromagnetic signals. For example, the communication circuits 380 may include a near field communication antenna and a near field communication transceiver. The communication circuits 380 may further include a transceiver and antenna for cellular phone, and other transceiver circuits and antennas for wireless local area network such as Bluetooth, WiFi, ZigBee, DLNA, UWB, RFID, etc.

The monitoring terminal 32 may further include batteries, power management circuits and other input/output units 400. The input/output units 400 may include a button, a joystick, a click wheel, a scroll wheel, a touch pad, a keypad, a keyboard, a camera, light emitting diodes and other status indicators, etc.

The user may input commands through the input/output circuits 420 to control the actions of the monitoring terminal 32, and may use the output data of the input/output circuits 420 to achieve receiving of status information and other outputs from the monitoring terminal 32.

The smart wearable device 31 is used for: obtaining, by at least one built-in motion sensor, posture data of a head of a user in real time, and transmitting, by the built-in wireless communication device, the obtained posture data to the monitoring terminal 32.

The monitoring terminal 32 is used for: receiving the posture data transmitted by the smart wearable device 31, monitoring whether the user suffers from a head disease and/or neck-shoulder disease based on the posture data, and in response to a detection of the user suffering from the head disease and/or the neck-shoulder disease, outputting a reminder message based on a preset reminder manner.

In one embodiment, the smart wearable device 31 is further used for: comparing the posture data with a preset angle range, and in response to a time duration of the posture data being outside the preset angle range being longer than the preset duration, notifying the user to correct the current bad posture based on the preset notifying manner.

Optionally, the motion sensor is a 9-axis motion sensor, and the smart wearable device 31 is further used for converting raw sensing data of the motion sensor obtained in real time into the posture data by using a quaternion algorithm.

Optionally, the posture data includes: yaw angles, pitch angles and roll angles, and at least one corresponding angular range is set for each type of the posture data. The smart wearable device 31 is further used for: comparing the yaw angles, the pitch angles and the roll angles with corresponding angle ranges of the yaw angles, the pitch angles and the roll angles, respectively; and in response to a time duration of some or all of the yaw angles, the pitch angles and the roll angles being outside the corresponding angle ranges being longer than the preset duration, notifying the user to correct the bad posture based on the preset notifying manner.

In one embodiment, a preset client application program is further installed on the monitoring terminal, and the preset reminder manner comprises: displaying a message for reminding the user to seek medical attention on an interactive interface of the preset client application program; or sending a message to a designated third-party terminal for reminding of a wearer of the smart wearable device 31 needing the medical attention.

In one embodiment, the monitoring terminal 32 is further used for: counting, in real time, a first time duration of the posture data falling into different preset threshold ranges within a preset real-time health monitoring period (such as, one day), and a second time duration of the posture data falling into the different preset threshold ranges within each of first preset time periods (such as, per 2 hours) of the preset real-time health monitoring period. The different preset threshold ranges indicate different health levels.

The monitoring terminal 32 is further used for: generating a first posture monitoring graph of the user based on the first time duration, generating a second posture monitoring graph of the user based on the second time duration, and displaying the first posture monitoring graph and the second posture monitoring graph on the interactive interface. The first posture monitoring graph is used for representing a distribution of postures with the different health levels of the user within the preset real-time health monitoring period. The second posture monitoring graph is used for representing a distribution of the postures with the different health levels of the user within each of the first preset time periods of the preset real-time health monitoring period.

In one embodiment, the monitoring terminal 32 is further used for: in response to the detection of the user suffering from the head disease and/or the neck-shoulder disease, monitoring a recovery state of the user in real time, counting a third time duration of the user wearing the smart wearable device within each of second preset time periods (such as, per day) of a preset recovery state monitoring period (such as, one week); comparing the posture data with a preset target value, obtaining, a ratio of a fourth time duration of the posture data reaching the target value to a time duration of each of the second preset time periods, within each of the second preset time periods, and determining a recovery trend based on the ratio and a difference between the posture data and the preset target value. The recovery trends include: maintaining, improving and declining.

The monitoring terminal 32 is further used for: generating a device wear time graph based on the third time duration, generating a posture recovery state graph based on the fourth time duration, and displaying the device wear time graph and the posture recovery state graph on the interactive interface. The posture recovery state graph includes: the ratio, a preset target ratio, and description information of the recovery trend.

In one embodiment, the monitoring terminal 32 is further used for transmitting posture data obtained during the preset recovery state monitoring period to a designated medical institution.

In one embodiment, the monitoring terminal 32 is further used for: rating and scoring at least one posture of head and/or neck-shoulder of the user within each of preset third time periods of a preset posture rating period based on the posture data obtained in real time, preset standard posture data and a preset rating standard, and obtaining rating results and scoring results; and generating a rating graph based on the rating results, generating a score changes graph based on the scoring results and a preset target score, and displaying the rating graph and the score changes graph on the interactive interface.

In one embodiment, the monitoring terminal 32 is further used for: obtaining at least one value inputted by the user on the interactive interface, and sending a configuration instruction and the at least one value to the smart wearable device 31.

The smart wearable device 31 is further used for: setting the preset duration and/or the preset angle range according to the at least one value in response to the configuration instruction sent by the monitoring terminal 32.

The monitoring terminal 32 is further used for: in response to a preset action performed by the user on the interactive interface, performing at least one action corresponding to the preset action. The at least one action corresponding to the preset action includes at least one of: controlling to turn on or off a posture monitoring, setting the preset target ratio, setting the reminder manner, setting the preset real-time health monitoring period, setting the preset recovery state monitoring period, setting the preset posture rating period, and setting a volume of the notifying voice.

Figure 5:
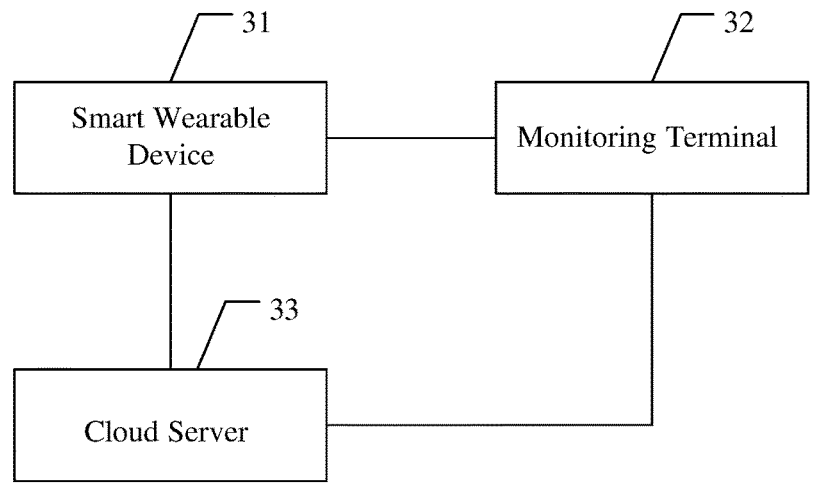
FIG. 5 is a schematic structure diagram of the system for user posture monitoring according to another embodiment of the present disclosure.

In one embodiment, as shown in FIG. 5, the system for user posture monitoring 30 further includes a cloud server 33. Optionally, the smart wearable device 31, the monitoring terminal 32 and the cloud server 33 may communicate based on any one of wireless communication protocols such as Bluetooth, WIFI, ZigBee, 2G/3G/4G/5G cellular, etc. The cloud server 33 may be a single server or a distributed server cluster composed of a plurality of servers.

The smart wearable device 31 is further used for transmitting the raw sensing data to the monitoring terminal 32.

The monitoring terminal 32 is further used for transmitting monitoring data to the cloud server 33, and the monitoring data may include, but is not limited to, the raw sensing data, the posture data and account information of the user.

The cloud server 33 is used for storing the raw sensing data, the posture data and the account information of the user transmitted by the monitoring terminal 32, and associating the raw sensing data and the posture data with the account information of the user in the cloud.

In one embodiment, the cloud server 33 is further used for using a preset supervised learning algorithm or a preset unsupervised learning algorithm to train all the posture data stored in the cloud periodically, and obtaining a posture classification model.

The monitoring terminal 32 is further used for: in response to the monitoring terminal 32 being online, obtaining the posture classification model from the cloud server 33, monitoring whether the user suffers from the head disease and/or the neck-shoulder disease based on the posture data and the obtained posture classification model, determining a category of a disease of the user, and obtaining exercise reminder information based on the category. The preset reminder manner includes: outputting the exercise reminder information based on a preset output manner.

The monitoring terminal 32 is further used for: in response to the monitoring terminal 32 being offline, monitoring whether the user suffers from the head disease and/or the neck-shoulder disease based on the posture data and a posture classification model stored on the monitoring terminal 32, and determining the category of the disease of the user.

The system for user posture monitoring provided by the above-mentioned embodiments, by obtaining and transmitting, through the smart wearable device, the posture data of the head of the user in real time to the monitoring terminal, and analyzing, through the monitoring terminal, the posture data, enables the analysis and provision of reminders for the user's head disease and/or neck-shoulder disease based on monitoring the posture of the user's head, so that the user can be helped to discover the hidden dangers of health in time and correct the discovered hidden dangers.

Figure 6:
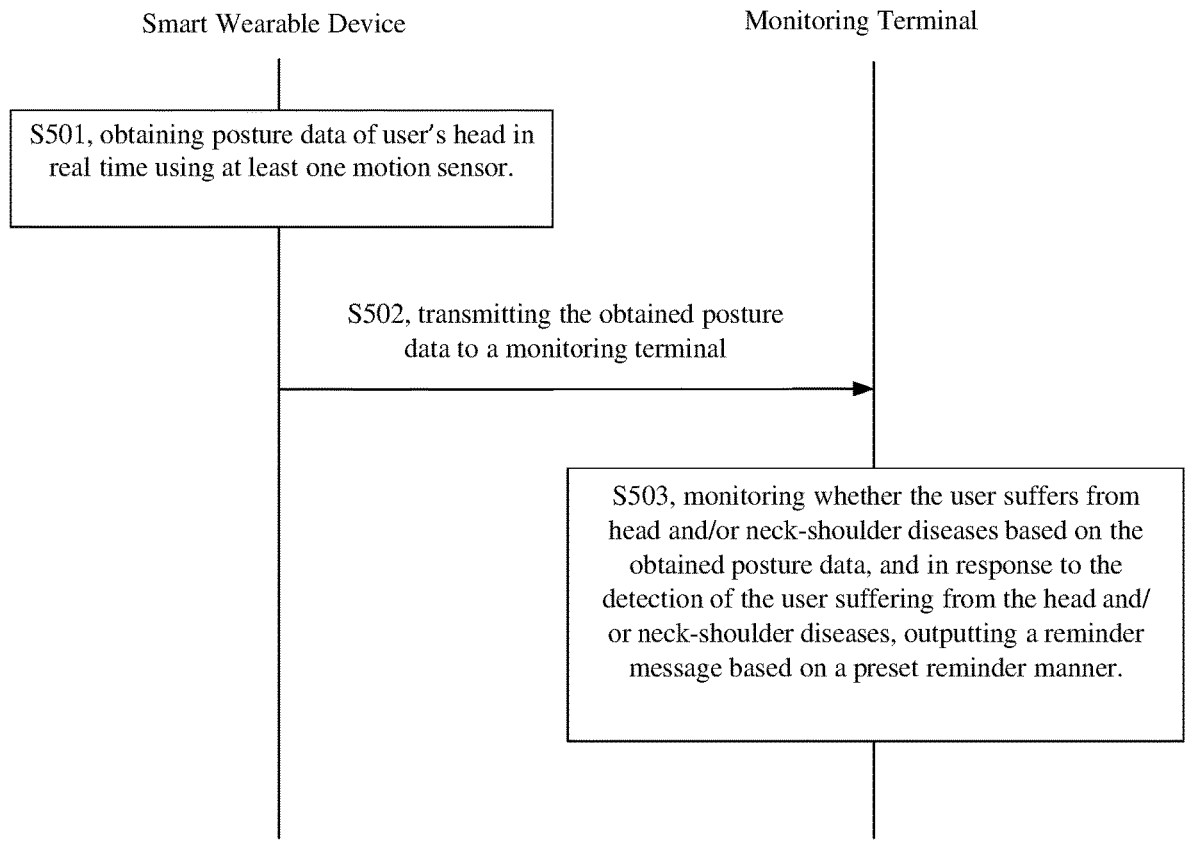
FIG. 6 is a timing diagram of a method for user gesture monitoring according to one embodiment of the present disclosure.
Figure 7:
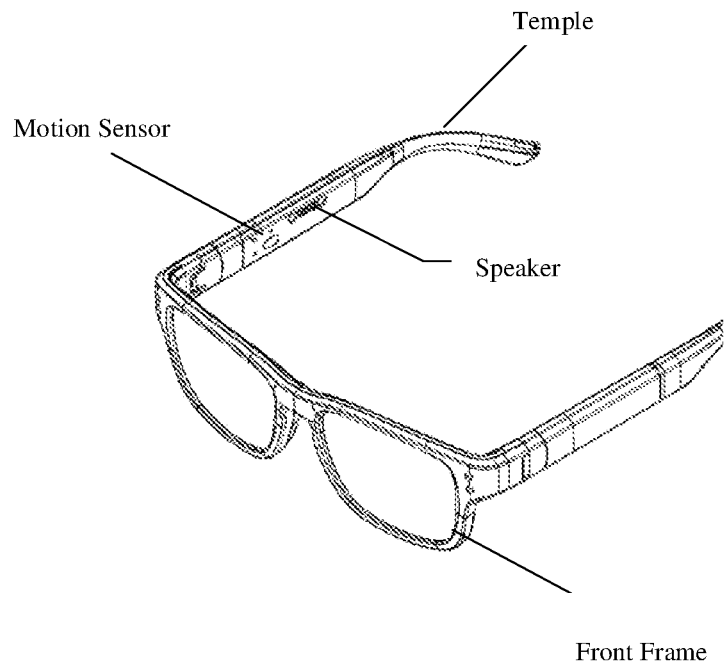
FIG. 7 is a schematic structure diagram of smart glasses as an example of the smart wearable device in the method for user posture monitoring shown in FIG. 6.

Referring to FIG. 6, a timing diagram of a method for user gesture monitoring according to one embodiment of the present disclosure. The method can be applied to the system for user posture monitoring shown in FIG. 3 or FIG. 5. As shown in FIG. 6, the method includes the following steps:

S501, obtaining, by a smart wearable device, posture data of a head of a user in real time using at least one motion sensor;

S502, transmitting, by the smart wearable device, the obtained posture data to a monitoring terminal;

In one embodiment, the smart wearable device may be, for example, smart glasses shown in FIG. 7. As shown in FIG. 7, the smart glasses include a front frame, temples, and a motion sensor and at least one speaker provided on the temples.

Optionally, the motion sensor is a 9-axis motion sensor, such as, a 9-axis IMU. The smart wearable device obtains raw sensing data (such as, IMU data) of the motion sensor, and converts the raw sensing data into the posture data using a quaternion algorithm.

Optionally, for improving the accuracy and stability of the sensing data, an average value of data collected by the motion sensor once every preset time period (such as, 10 seconds) is calculated as the raw sensing data.

Figure 9:
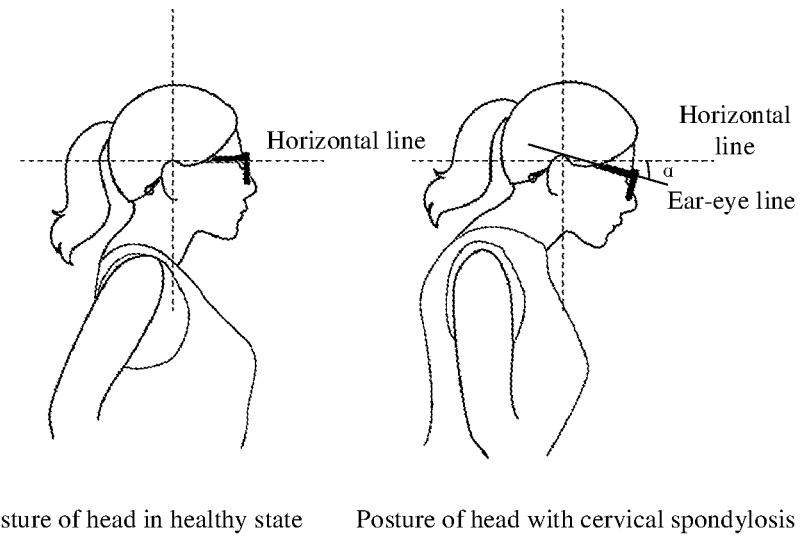
FIG. 9 is a schematic diagram of head postures of a user in different states in the method for user posture monitoring shown in FIG. 6.

Specifically, the posture data includes: yaw angles, pitch angles and roll angles. The yaw angle refers to a direction of the head of the user in the horizontal direction, and is rotated about the y-axis of a preset coordinate system. The pitch angle refers to an angle with the horizontal direction, and is rotated about the x-axis of the preset coordinate system. The roll angle refers to a rotation angle of the head of the user around the z-axis of the preset coordinate system. The preset coordinate system may be a world coordinate system or an object coordinate system. As shown in FIG. 9, taking the smart wearable device as the smart glasses as an example, the pitch angle α of the smart glasses closely resembles the angle between an ear-eye line of the user and a preset horizontal line. The ear-eye line is a connection line between an ear and an eye of the user. Optionally, the horizontal line is parallel to the ground and at the same height as the user's ears. In practical applications, the position of the horizontal line is not limited to this, and can be specifically determined according to the wearing position of the smart wearable device.

When the smart glasses are worn correctly, the yaw angles, the pitch angles and the roll angles can be used to represent postures of head and neck-shoulder of the user. It is understandable that any one of the yaw angles, the pitch angles and the roll angles, or different combinations of any number of angles in the yaw angles, the pitch angles and the roll angles can represent different postures of the head and the neck-shoulder of the user. For example, the pitch angles are used to represent angles at which the head of the user tilts forward and backward, the yaw angles are used to represent angles at which the head of the user tilts left and right, the roll angles are used to represent angles at which the head of the user tilts sideways. The neck and shoulder are linked to the head, the posture of the neck-shoulder usually change with the posture of the head, but not to the same extent. Therefore, the posture of the neck-shoulder can be obtained based on the posture of the head and a preset offset. The offsets corresponding to different postures can be the same or different.

Specifically, the values of the accelerometer, gyroscope and magnetometer from the 9-axis IMU are first used to find the orientation of the sensor (in the form of quaternion representation), a predefined reference direction of a field in the terrestrial coordinate system is aligned with a measurement field in the sensor coordinate system, and a quaternion gradient descent algorithm is then used to convert the raw sensing data into the posture data.

Figure 8:
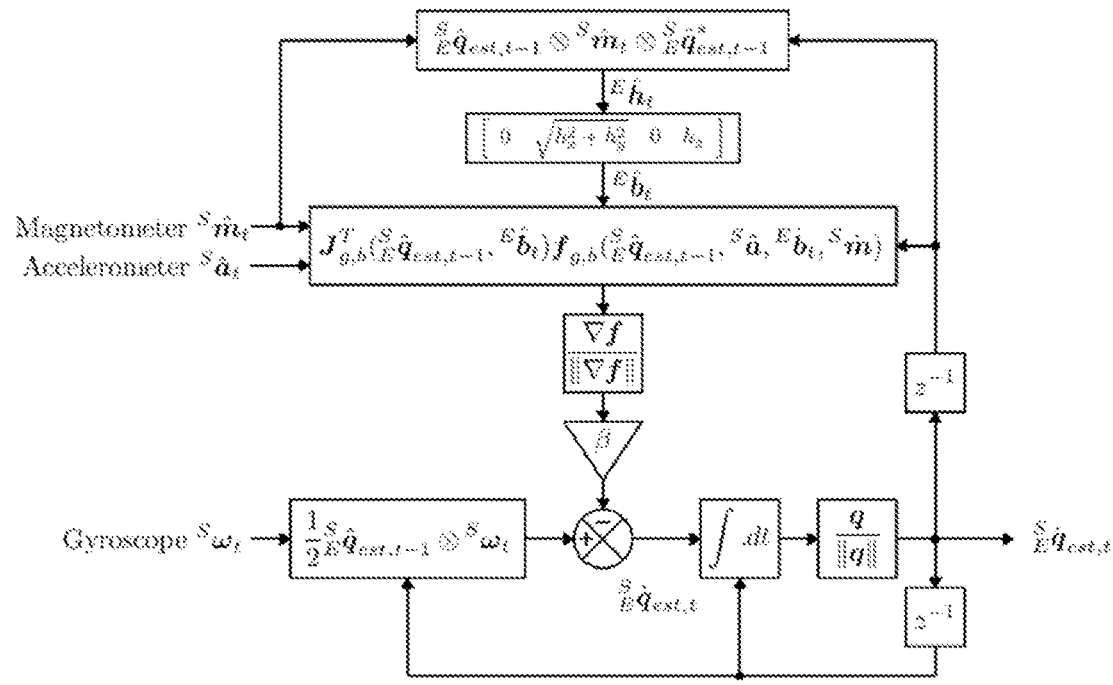
FIG. 8 is a schematic diagram of a quaternion algorithm in the method for user posture monitoring shown in FIG. 6.

As shown in FIG. 8, first, the direction of the magnetic field of the Earth at the current time is calculated according to a magnetic force value $s_{\hat{m}t}$ measured at the current time, the calculation formula is: ${}^E\hat{h}_t = {}^S_E\hat{q}_{est,t-1} \otimes S_{\hat{m}t} \otimes {}^S_E\hat{q}^*_{est,t-1}$, and the obtained calculation result is: ${}^E\hat{h}_t = [0\ h_x\ h_y\ h_z]$. Then, the magnetic distortion compensation is performed on the above calculation result to obtain ${}^E\hat{b}_t = [0\sqrt{h_x^2 + h_y^2}\ 0\ h_z]$, that is, ${}^E\hat{b}_t$ is a parameter of ${}^E\hat{h}_t$ after standardization in the way of the magnetic distortion compensation.

Further, a gradient descent calculation is performed according to ${}^E\hat{b}_t$, $S_{\hat{m}t}$ and an acceleration value set measured at the current time, to obtain $\nabla f = J_{g,b}^T({}^S_E\hat{q}_{est,t-1},\ {}^E\hat{b}_t)f_{g,b}({}^S_E\hat{q}_{est,t-1},\ {}^S\hat{a},\ {}^E\hat{b}_t,\ S_{\hat{m}})$.

Further, according to the formula $$_E^S\hat{q}_{est,t} = {}_E^S\hat{q}_{\omega,t} - \beta \frac{\nabla f}{\|\nabla\|},$$

where, $\beta$ is a derivative of q, which represents an error of measurement value of the gyroscope, a direction estimation $$_E^S\hat{q}_{\omega,t} = \frac{1}{2}{}_E^S\hat{q}_{est,t-1} \otimes {}^S\omega_t$$

is calculated, where, $\frac{1}{2}{}_E^S\hat{q}_{est,t-1} \otimes {}^S\omega_t$ represents a direction estimation calculated using the value of the gyroscope, ${}_E^S\hat{q}_{est,t}$ represents an estimated value of proportion of the direction change. Further, an integral calculation $\int \cdot dt$ and a normalized calculation $$\frac{q}{\|q\|}$$

are performed on the estimated value ${}_E^S\hat{q}_{est,t}$ of proportion of the direction change, to obtain ${}_E^S\hat{q}_{est,t}$ representing a direction estimation of a time value t, and then the next calculation cycle is performed based on ${}_E^S\hat{q}_{est,t}$, a direction estimation of a time value t+1 is calculated, so as to obtain the posture data.

In the above formula, m is a magnetic force value (i.e., a normalized magnetometer reading); a is a normalized accelerometer reading; g is a normal acceleration of gravity; ω is a value of gyroscope (i.e., a gyroscope reading); b is the predefined reference direction of the magnetic field in the terrestrial coordinate system; h is a measurement direction of the magnetic field of the Earth; q is a quaternion representation of the direction; $q_{est}$ represents an estimated value of the q in the algorithm, not the measurement value; S is data described relative to the sensor reference frame; E is a measurement value of the terrestrial reference system; t represents the current time; t−1 represents the previous time of the current time; ⊗ represents a tensor product operation.

In one embodiment, the complete formulas for f and j are further as follows:

$$f_b({}^S_E\hat{q},\ {}^E\hat{b},\ {}^S\hat{m}) = \begin{bmatrix} 2b_x(0.5 - q_3^2 - q_4^2) + 2b_z(q_2q_4 - q_1q_3) - m_x \\ 2b_x(q_2q_3 - q_1q_4) + 2b_z(q_1q_2 + q_3q_4) - m_y \\ 2b_x(q_1q_3 + q_2q_4) + 2b_z(0.5 - q_2^2 - q_3^2) - m_z \end{bmatrix};$$

$$J_b({}^S_E\hat{q},\ {}^E\hat{b}) = \begin{bmatrix} -2b_xq_3 & 2b_zq_4 & -4b_xq_3 - 2b_zq_1 & -4b_xq_4 + 2b_zq_2 \\ -2b_xq_4 + 2b_zq_2 & 2b_xq_3 + 2b_zq_1 & 2b_xq_2 + 2b_zq_4 & -2b_xq_1 + 2b_zq_3 \\ 2b_xq_3 & 2b_xq_4 - 4b_zq_2 & 2b_xq_1 - 4b_zq_3 & 2b_xq_2 \end{bmatrix};$$

where, $q_1$-$q_4$ are quaternions of q; bx and bz are the components in the X and Z axis directions in the predefined reference direction of the magnetic field in the terrestrial coordinate system; mx, my, and mz are the components of values of the magnetometer in the X, Y, and Z axis directions in the predefined reference direction of the magnetic field in the terrestrial coordinate system.

Optionally, in addition to the above-mentioned quaternion algorithm, there is further a simple way to calculate the pitch angle, the roll angle and the average value to obtain the posture data.

First, the pitch angle (Pitch) and the roll angle (Roll) are calculated based on the acceleration values in the raw sensing data of the motion sensor using the following arctangent function formulas:

$$\text{Pitch} = \text{atan}\left(\frac{\text{accel\_y}}{\text{accel\_z}}\right);$$

$$\text{Roll} = \text{atan}\left(\frac{\text{accel\_x}}{\text{accel\_z}}\right);$$

where, accel_x, accel_y, accel_z are the accelerometer readings of x, y, and z respectively.

Then, an average value within a constant period is taken as the posture data, for example, the averaging is performed every 1 second to smooth errors due to jitter.

At this time, the yaw angle in the posture data can be obtained based on the values of the gyroscope in the 9-axis motion sensor.

The above-mentioned different postures of head and neck-shoulder of the user include: various postures of head and neck-shoulder of the user in a healthy state, various postures that the user has when the user suffering from various diseases in the head and neck-shoulder (for example, when a lesion occurs in the left or right hemisphere of the human brain, the subjective visual vertical (SVV) perception will be affected, it causes the head of the human to tilt to one side), and various bad postures of head and neck-shoulder of the user (such as, a posture of forward bending of the head during prolonged downward gaze, which may cause the musculoskeletal pain in the user), when the bad postures are maintained for a long time, they may cause physical discomfort or cause certain diseases.

S503, monitoring, by the monitoring terminal, whether the user suffers from a head disease and/or a neck-shoulder disease based on the obtained posture data, and in response to the detection of the user suffering from the head disease and/or the neck-shoulder disease, outputting a reminder message based on a preset reminder manner, wherein the reminder message includes information for reminding the user to pay attention to at least one disease that the user may have in the head and/or the neck-shoulder.

Optionally, a preset client application program is installed on the monitoring terminal. The smart wearable device may wirelessly communicate with the monitoring terminal through Bluetooth, and continuously transmit the posture data of the wearer of the smart wearable device obtained by the built-in motion sensor(s) to the monitoring terminal. The posture data may be stored on the memory of the monitoring terminal, and is used by the client application program to analyze the postures of the head or neck-shoulder of the wearer to monitor whether the user suffers from the head disease and/or the neck-shoulder disease. The analyzing is performed based on comparing data captured by the smart wearable device when the user wearing the smart wearable device with preset thresholds, or based on a preset posture classification model.

The posture classification model may be built by a cloud server. In one embodiment, the method further includes:
  transmitting, by the smart wearable device, raw sensing data of the at least one motion sensor to the monitoring terminal;
  transmitting, by the monitoring terminal, monitoring data to the cloud server, wherein the monitoring data may include, but is not limited to, the raw sensing data, the posture data, and account information of the user;
  storing, by the cloud server, the raw sensing data, the posture data and the account information of the user transmitted by the monitoring terminal, and associating the raw sensing data and the posture data with the account information of the user in the cloud; and
  training, by the cloud server, all the posture data stored in the cloud periodically using a preset supervised learning algorithm or a preset unsupervised learning algorithm, and obtaining the posture classification model.

Figure 10:
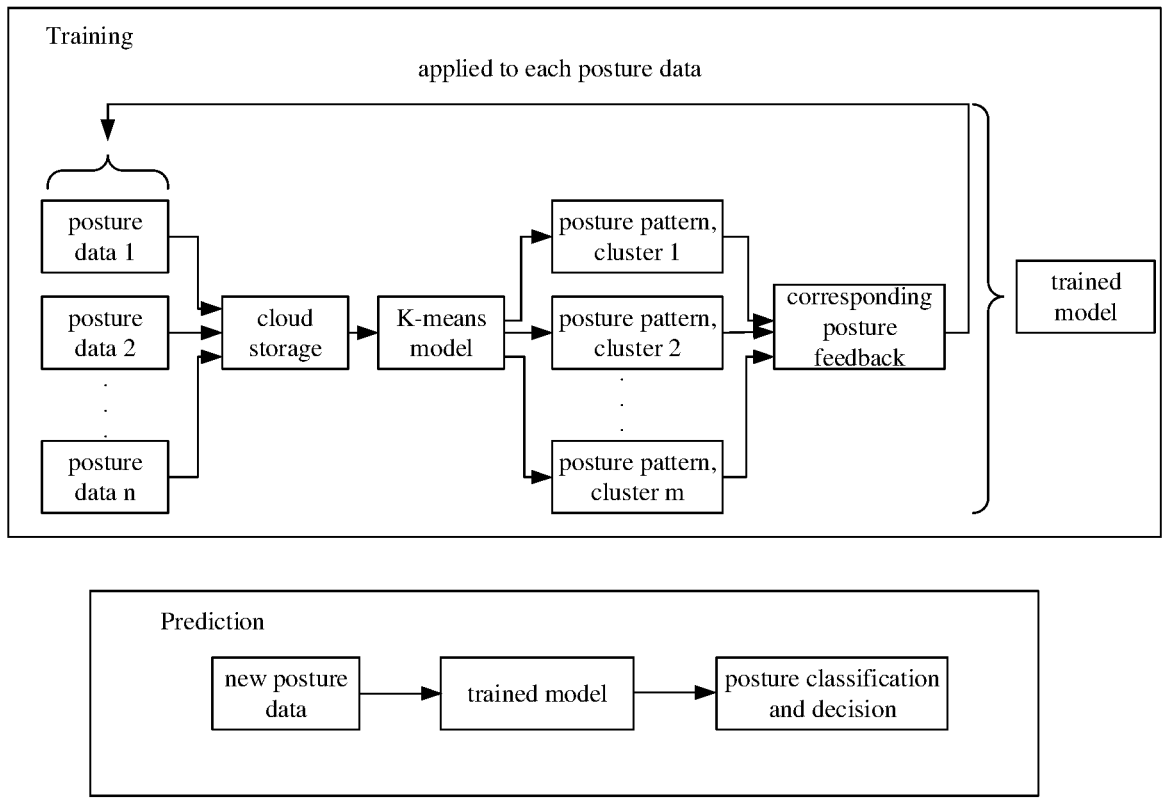
FIG. 10 is a schematic diagram of obtaining a posture classification model by using an unsupervised learning algorithm in the method for user posture monitoring according to one embodiment of the present disclosure.

The unsupervised learning algorithm may be, for example, but is not limited to, a k-means clustering algorithm. The k-means clustering algorithm is an unsupervised learning algorithm without class labels. The principle of k-means clustering algorithm is to cluster k points in space, classify the objects closest to them, and update the values of each cluster center one by one through iterative method until the best clustering result is obtained. As shown in FIG. 10, the cloud server inputs all the posture data stored in the cloud into the k-means model to aggregate similar data together, so as to obtain a trained posture classification model including a plurality of posture pattern classifications and corresponding posture feedback (or suggestions). The posture pattern classifications included in the trained posture classification model include: various posture pattern classifications of head and neck-shoulder of the user in the healthy state, and various posture pattern classifications that the user has when the user suffering from various diseases in the head and the neck-shoulder.

Figure 11:
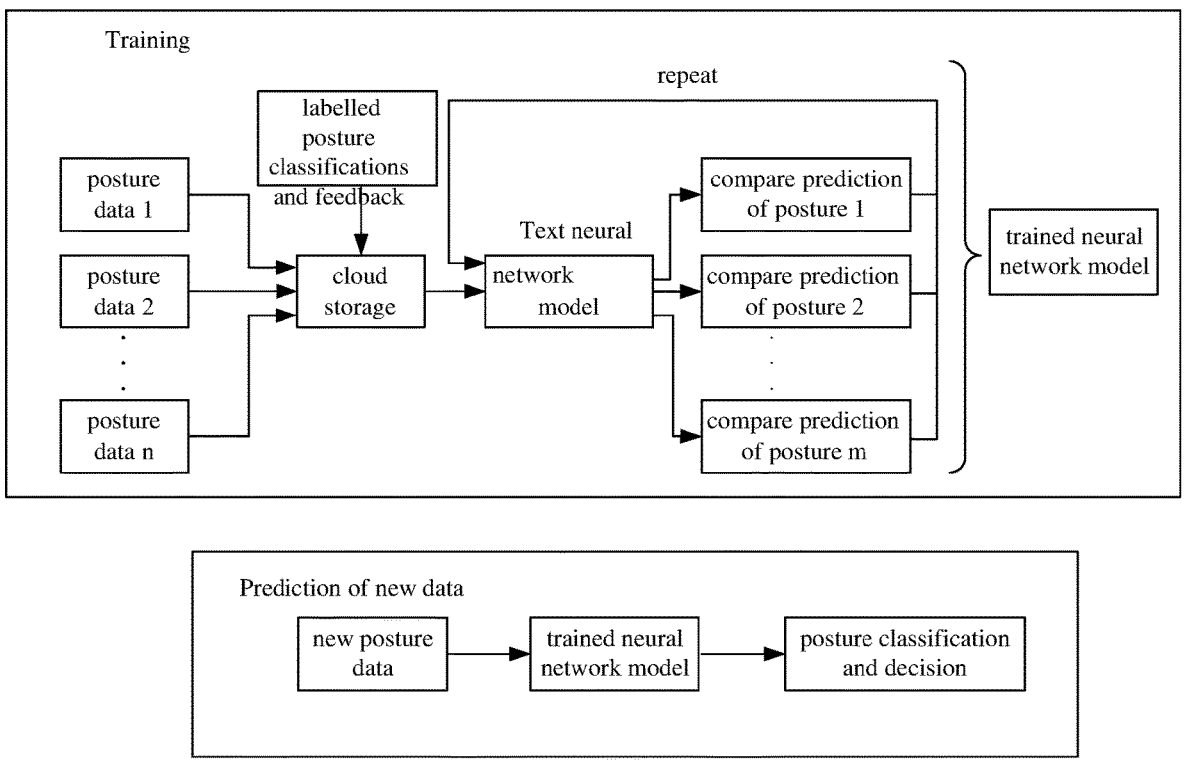
FIG. 11 is a schematic diagram of obtaining the posture classification model by using a supervised learning algorithm in the method for user posture monitoring according to one embodiment of the present disclosure.

The supervised learning algorithm may be, for example, but are not limited to, a neural network algorithm. As shown in FIG. 11, the cloud server inputs all the posture data stored in the cloud and targets of each data point marked based on potential health effects or feedback made by experts on the data into an untrained neural network model for training, and performs a certain number of training iterations, so as to obtain a trained posture classification model.

The monitoring terminal downloads the trained posture classification model from the cloud server periodically or downloads the trained posture classification model from the cloud server when the monitoring terminal accessing the network, inputs the posture data transmitted by the smart wearable device into the downloaded posture classification model, matches, through the posture classification model, the posture data with characteristic data of various postures obtained by training in the posture classification model, and obtains the posture pattern classification and feedback of the current posture of the head and/or the neck-shoulder of the wearer of the smart wearable device. The feedback may include, but are not limited to, an exercise suggestion or a treatment method suggestion for the current posture when the current posture of the user is a posture that occurs only with a certain disease, and an exercise suggestion for preventing diseases that may be caused by the current posture of the user.

Optionally, the monitoring terminal has an online monitoring mode and an offline monitoring mode. The step of monitoring, by the monitoring terminal, whether the user suffers from the head disease and/or the neck-shoulder disease based on the obtained posture data specifically includes:
  monitoring whether the monitoring terminal is in an online state;
  in response to the monitoring terminal being in the online state, obtaining, by the monitoring terminal, the posture classification model from the cloud server, monitoring whether the user suffers from the head disease and/or the neck-shoulder disease based on the posture data and the obtained posture classification model, and determining a category of a disease of the user; and
  in response to the monitoring terminal being in an offline state, monitoring, by the monitoring terminal, whether the user suffers from the head disease and/or the neck-shoulder disease based on the posture data and a locally stored posture classification model, and determining the category of the disease of the user.

Optionally, the step of in response to the detection of the user suffering from the head disease and/or the neck-shoulder disease, outputting the reminder message based on the preset reminder manner specifically includes: in response to the detection of the user suffering from the head disease and/or the neck-shoulder disease, displaying, by the monitoring terminal, a message for reminding the user to seek medical attention on an interactive interface of the preset client application program; or, in response to the detection of the user suffering from the head disease and/or the neck-shoulder disease, sending, by the monitoring terminal, a message to a designated third-party terminal for reminding of a wearer of the smart wearable device needing the medical attention. The third-party terminal may be a terminal used by a family member or caregiver of the wearer of the smart wearable device. The third-party terminal may be designated by the client application program installed on the monitoring terminal.

Optionally, the trained posture classification model further includes exercise reminder information, or the cloud server is further provided with a database storing corresponding relationships between different categories of the head diseases and/or the neck-shoulder diseases and different exercise reminder information. When the user is identified as having the head disease and/or the neck-shoulder disease and the monitoring terminal is in the online state, the monitoring terminal obtains the exercise reminder information by using the posture classification model or the corresponding relationships according to the determined the category of the disease suffered by the user.

The monitoring terminal may download and store the database locally in advance and update the stored database periodically, and obtains the corresponding exercise reminder information by querying the database stored locally. Alternatively, the monitoring terminal may also directly transmit the determined category of the disease suffered by the user to the cloud server, and obtains the corresponding exercise reminder information by using the cloud server to query the database.

The step of outputting the reminder message based on the preset reminder manner in response to the detection of the user suffering from the head disease and/or the neck-shoulder disease specifically further includes: outputting the exercise reminder information according to a preset output mode, wherein the exercise reminder information is used for suggesting that the user can perform certain specific exercise(s) to treat or relieve the diseases suffered by the user. Outputting the exercise reminder information according to the preset output mode may include, but is not limited to, at least one of: outputting an exercise reminder voice by speaker(s) of the monitoring terminal and/or the smart wearable device, and outputting exercise reminder text(s) and/or animation(s) by the display screen of the monitoring terminal and/or the smart wearable device.

In one embodiment, the method further includes: comparing, by the smart wearable device, the posture data with a preset angle range; and in response to a time duration of the posture data being outside the preset angle range being longer than the preset duration, determining that the current posture of the user is a bad posture, and notifying the user to correct the current bad posture based on the preset notifying manner. By using the smart wearable device to monitor and remind the bad posture of the user based on the obtained posture data, the user can be helped to correct the bad posture in time, thereby reducing the probability of the user suffering from related diseases.

Optionally, at least one corresponding angular range is set for each type of the posture data. The smart wearable device compares the yaw angles, the pitch angles and the roll angles with corresponding angle ranges of the yaw angles, the pitch angles and the roll angles, respectively. When a time duration of some or all of the yaw angles, the pitch angles and the roll angles being outside the corresponding angle ranges is longer than the preset duration, the smart wearable device notifies the user to correct the current bad posture based on the preset notifying manner.

The preset notifying manner may include, but is not limited to at least one of: outputting a notifying voice by the built-in speaker(s), displaying notifying text(s) or animation(s) on the display screen, vibrating by the built-in vibration device, and projecting reminder image(s) by the built-in laser projection device.

In one embodiment, the monitoring terminal further analyzes the posture data transmitted by the smart wearable device through a preset client application program to obtain the health level of the user and monitor the recovery state of the user. Specifically, the method further includes:

counting, by the monitoring terminal, a first time duration of the posture data falling into different preset threshold ranges within a preset real-time health monitoring period (such as, one day) and a second time duration of the posture data falling into the different preset threshold ranges within each of first preset time periods (such as, per hour) of the preset real-time health monitoring period, in real time, wherein the different preset threshold ranges indicate different health levels; and generating a first posture monitoring graph of the user based on the first time duration, generating a second posture monitoring graph of the user based on the second time duration, and displaying the first posture monitoring graph and the second posture monitoring graph on the interactive interface, wherein the first posture monitoring graph is used for representing a distribution of postures with the different health levels of the user within the preset real-time health monitoring period, and the second posture monitoring graph is used for representing a distribution of the postures with the different health levels of the user within each of the first preset time periods of the preset real-time health monitoring period.

Figure 12:
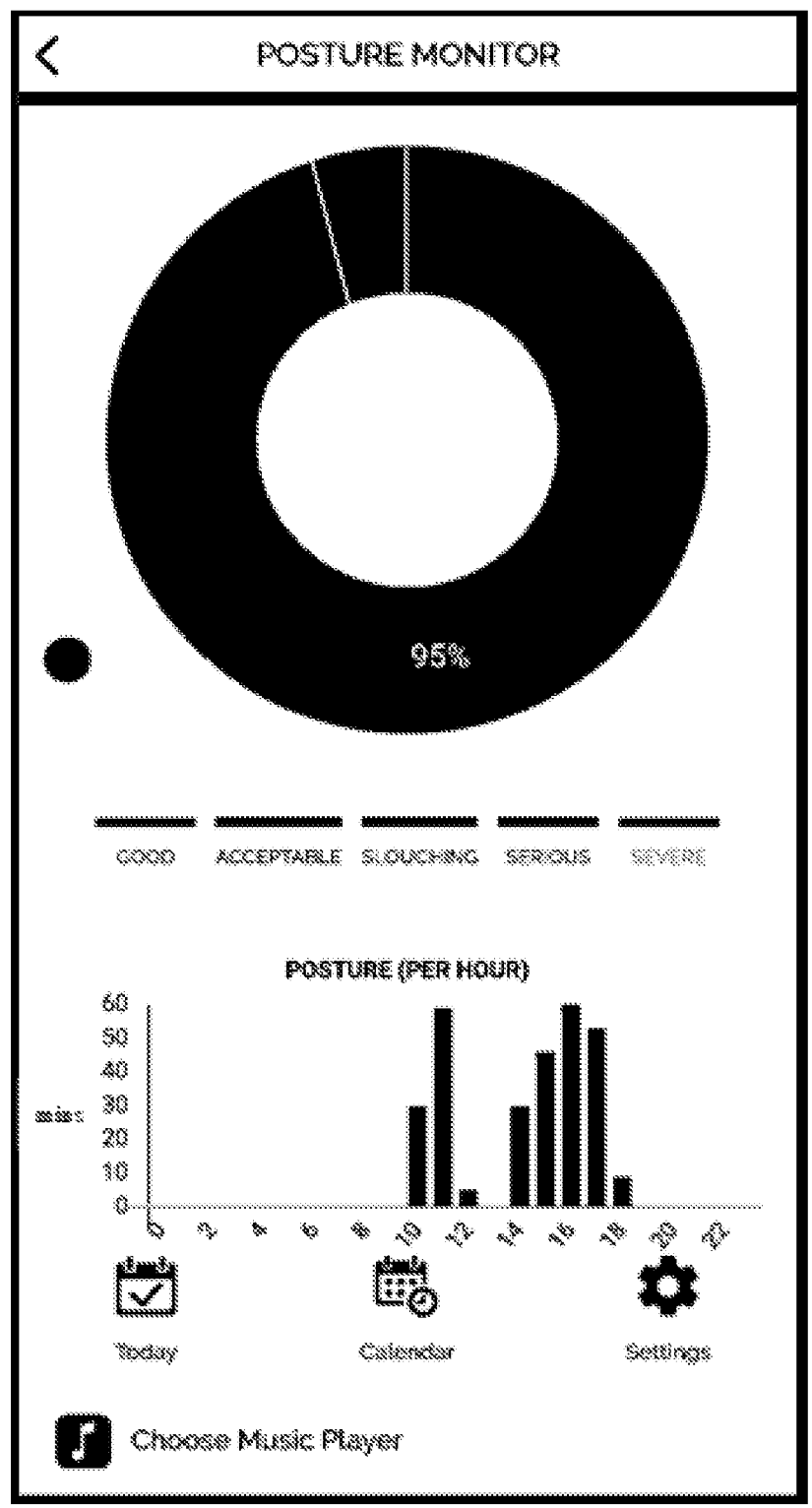
FIG. 12 is a schematic diagram of a first posture monitoring graph and a second posture monitoring graph in the method for user posture monitoring according to one embodiment of the present disclosure.

As shown in the upper part of FIG. 12, the first posture monitoring graph may be, for example, a doughnut chart used for reflecting how healthy the user's posture is over the entire day. As shown in the lower part of FIG. 12, the second posture monitoring graph may be, for example, a histogram used for reflecting the real-time health level of the user's posture. The health levels may include, but are not limited to, Good, Acceptable, Slouching, Serious, and Severe. For example, the health levels can be determined based on angles between the head and the horizon line, and the larger the angle, the lower the health level corresponding to the posture of the head.

In one embodiment, the method further includes:

in response to the detection of the user suffering from the head disease and/or the neck-shoulder disease, monitoring, by the monitoring terminal, a recovery state of the user in real time, counting a third time duration of the user wearing the smart wearable device within each of second preset time periods (such as, per day) of a preset recovery state monitoring period (such as, one week);

comparing the posture data with a preset target value, and obtaining a ratio of, a fourth time duration of the posture data reaching the target value, to a time duration of each of the second preset time periods, within each of the second preset time periods;

determining a recovery trend based on the ratio and a difference between the posture data and the preset target value, wherein recovery trends include maintaining, improving and declining; and generating a device wear time graph based on the third time duration, generating a posture recovery state graph based on the fourth time duration, and displaying the device wear time graph and the posture recovery state graph on the interactive interface, wherein the posture recovery state graph includes: the ratio, a preset target ratio, and description information of the recovery trend.

Figure 13:
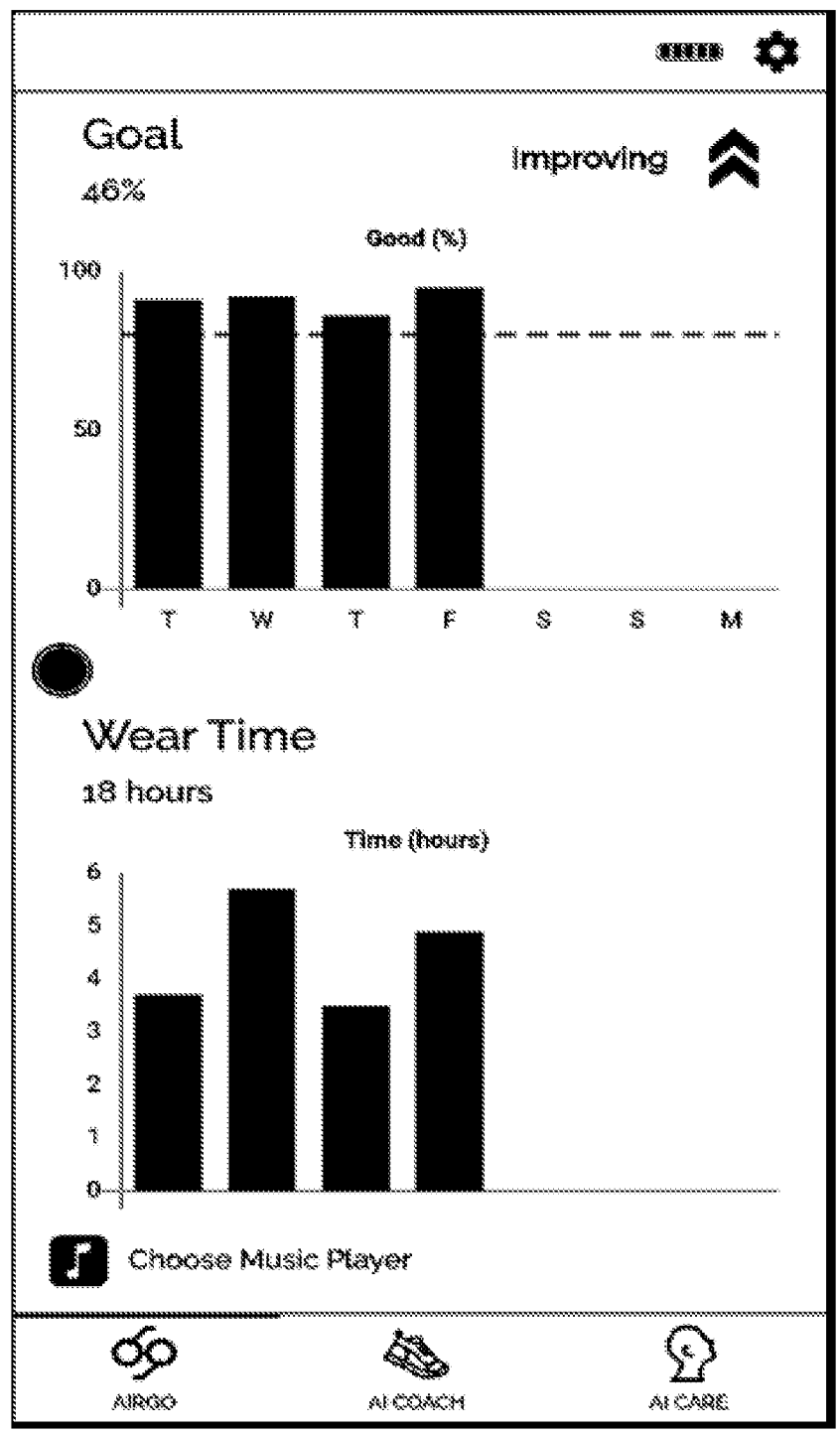
FIG. 13 is a schematic diagram including a device wear time graph and a posture recovery state graph in the method for user posture monitoring according to one embodiment of the present disclosure.

As shown in FIG. 13, the device wear time graph and the posture recovery state (Goal) graph may be, for example, the histograms.

In one embodiment, the method further includes: transmitting, by the monitoring terminal, posture data obtained during the preset recovery state monitoring period to a designated medical institution. For example, the monitoring terminal may transmit the posture data to a chiropractor or physical therapist to facilitate diagnosis or therapy.

In one embodiment, the method further includes:

rating and scoring, by the monitoring terminal, at least one posture of the head and/or the neck-shoulder of the user within each of preset third time periods (such as, per day) of a preset posture rating period (such as, one week) based on the posture data obtained in real time, preset standard posture data and a preset rating standard, and obtaining rating results and scoring results; and generating a rating graph based on the rating results, generating a score changes graph based on the scoring results and a preset target score, and displaying the rating graph and the score changes graph on the interactive interface.

Figure 14:
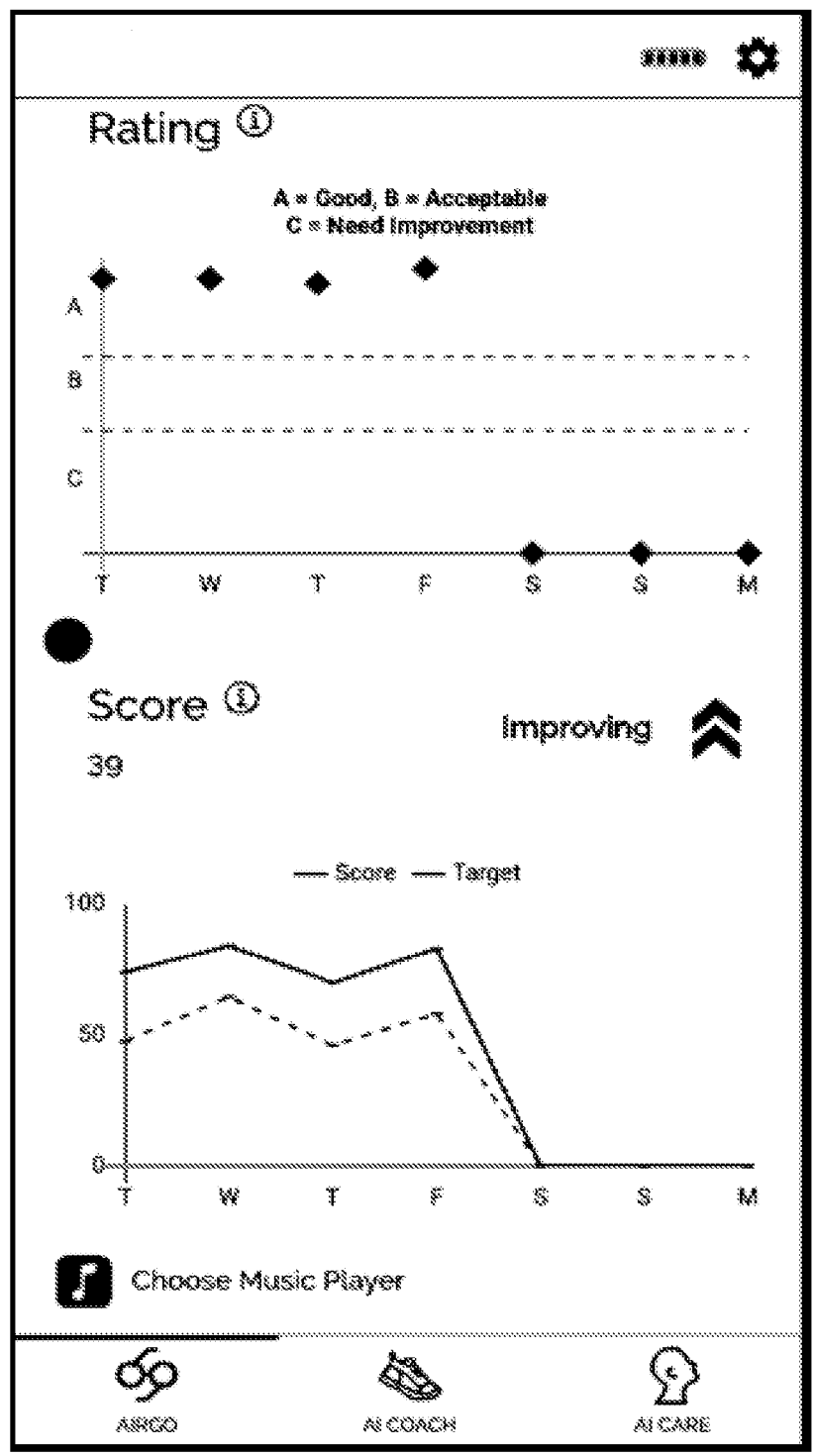
FIG. 14 is a schematic diagram including a rating graph and a score changes graph in the method for user gesture monitoring according to one embodiment of the present disclosure.

As shown in the lower part of FIG. 14, the score changes graph may be, for example, a curve graph. The rating results (Rating), may include, for example, but are not limited to, three grades: A (Good), B (Acceptable), and C (Need Improvement). The scoring results (Score) may be on a hundred-point scale. The preset rating standard may be determined based on tilt angles of the head or the neck-shoulder of the user in different directions and the time duration of maintaining each of the tilt angles. In one embodiment, corresponding basic values and weights can further be configured for tilt angles (or yaw angles, pitch angles and roll angles) in different directions and different time durations, and a weighting algorithm is used for scoring.

In one embodiment, the monitoring terminal further determines the recovery trend of the user based on a difference change between the scoring result (Score) of each preset third time period within the preset posture rating period and the preset target score (Target) of each preset third time period, and marks the determined recovery trend in the score changes graph in the form of icons and/or text, for example, the text "Improving" and the upward arrow in the score changes graph shown in FIG. 14.

It should be noted that, FIGS. 12 to 14 are only one example, the monitoring terminal may further generate graphs having the same meaning as FIGS. 12 to 14, but in the form of other graphical representations or with other numerical descriptions. The above-mentioned graphs can be generated and displayed according to preset actions performed by the user on the interactive interface provided by the client application program on the monitoring terminal. The preset actions may be, for example, the operations of the user clicking button(s) or menu configured on the interactive interface for generating the above-mentioned graphs.

By using the above-mentioned graphs, the user can be helped to understand the health level and recovery trend of the posture(s) of the head and/or the neck-shoulder of the user in time, and this may act as positive reinforcement for the user in encouraging prolonged periods in good posture.

Figure 15:
FIG. 15 is a schematic diagram of an interactive interface provided by a client application program on the monitoring terminal in the method for user gesture monitoring according to one embodiment of the present disclosure.

Optionally, the above-mentioned parameters such as the preset duration, angle range, threshold value and target value can be customized by the user. Specifically, the method further includes:
  obtaining, by the monitoring terminal, at least one value inputted by the user on the interactive interface, and sending a configuration instruction and the at least one value to the smart wearable device;
  in response to the configuration instruction sent by the monitoring terminal, setting, by the smart wearable device, the preset duration and/or the preset angle range according to the at least one value; and
  in response to a preset action performed by the user on the interactive interface shown in FIG. 15, performing, by the monitoring terminal, at least one action corresponding to the preset action, wherein the at least one action corresponding to the preset action includes at least one of: controlling to turn on or off a posture monitoring, setting the preset target ratio, setting the reminder manner, setting the preset real-time health monitoring period, setting the preset recovery state monitoring period, setting the preset posture rating period, and setting a volume of the notifying voice.

Figure 16:
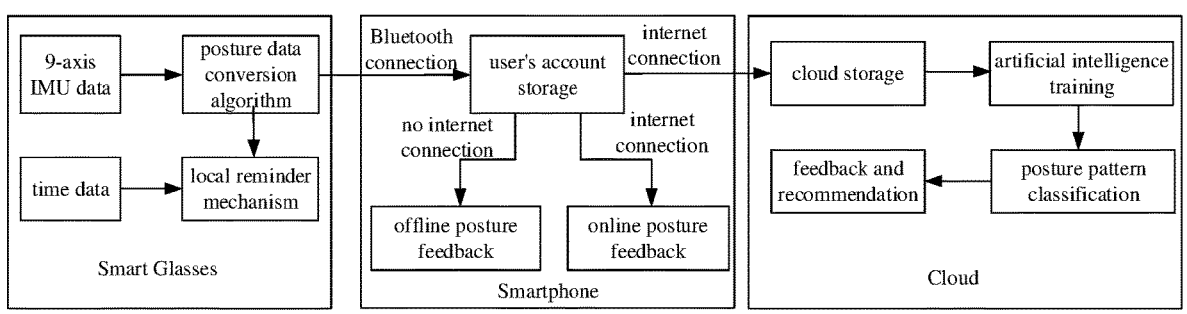
FIG. 16 is an exemplary diagram of the method for user gesture monitoring according to one embodiment of the present disclosure.

As shown in FIG. 16, for example, the method for user posture monitoring provided by the embodiments of the present disclosure is implemented by smart glasses, a smartphone and cloud server(s). The communication between the smart glasses and the smartphone is based on Bluetooth, and the smartphone and the cloud server(s) are connected based on wireless or wired networks.

Based on the glasses reminder mechanism, the smart glasses use a preset posture data conversion algorithm to process the 9-axis data of the motion sensor and obtain the posture data, combines the posture data and the time data to monitor the postures of the user, analyzes whether the current posture of the user is a bad posture to make early warning, and transmits real-time obtained sensing data (such as, the 9-axis data and posture data) to the smartphone via Bluetooth in real time. The preset posture data conversion algorithm may be a quaternion algorithm. Alternatively, the preset posture data conversion algorithm may be an arctangent function.

The smartphone creates a personal account for the user of the smart glasses, and associates and stores the received real-time sensing data of the user with the personal account. The smartphone regularly establishes a network connection with a cloud server, obtains a posture classification model from the cloud server through the network connection, and transmits monitoring data to the cloud server. The monitoring data includes: information of the personal account, and the sensing data associated with the personal account. The smartphone has an online mode and an offline mode. When the smartphone is online (i.e. in the online mode), the smartphone downloads the latest posture classification model from the cloud server, and analyzes the posture data transmitted by the smart glasses in real time based on the downloaded posture classification model, to determine whether the user suffers from the head disease and/or the neck-shoulder disease and make early warning. When the smartphone is offline (i.e. in the offline mode), the smartphone analyzes the posture data transmitted by the smart glasses in real time based on the posture classification model downloaded from the cloud server for the last time, to determine whether the user suffers from the head disease and/or the neck-shoulder disease and make early warning.

The cloud server stores the monitoring data transmitted by the smartphone, and regularly uses the unsupervised algorithm or the supervised learning algorithm to perform the artificial intelligence learning training on all the monitoring data stored in the cloud, to perform the posture classification, so as to obtain the posture classification model and store the obtained posture classification model in the cloud server.

Optionally, all the monitoring data stored in the cloud may include not only all monitoring data of the current user, but also monitoring data of other users.

The method for user posture monitoring provided by the above-mentioned embodiments, by obtaining and transmitting, through the smart wearable device, the posture data of the head of the user in real time to the monitoring terminal, and analyzing, through the monitoring terminal, the received posture data, enables the analysis and provision of reminders for the user's head disease and/or neck-shoulder disease based on monitoring the posture of the user's head, so that the user can be helped to discover the hidden dangers of health in time and correct the discovered hidden dangers.

It should be understood that in the above-described embodiments of the present disclosure, the above-mentioned system and method for user posture monitoring, and smart wearable device may be implemented in other manners. For example, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above-mentioned embodiments are only preferred embodiments of the present application and are not intended to limit the present application, any modifications, equivalent substitutions and improvements made within the spirit and principles of the present application shall be included in the scope of protection of the present application.

What is claimed is:

1. A system for user posture monitoring, comprising: a smart wearable device and a monitoring terminal, wherein the smart wearable device is equipped with at least one motion sensor and a wireless communication device;
    the smart wearable device is configured for: obtaining, by the at least one motion sensor, posture data of a head of a user in real time, and transmitting, by the wireless communication device, the posture data to the monitoring terminal; and
    the monitoring terminal is configured for: receiving the posture data transmitted by the smart wearable device, monitoring whether the user suffers from a head disease and/or a neck-shoulder disease based on the posture data, and in response to a detection of the user suffering from the head disease and/or the neck-shoulder disease, outputting a reminder message based on a preset reminder manner.

2. The system of claim 1, wherein the smart wearable device is further configured for: comparing the posture data with a preset angle range, and in response to a time duration of the posture data being outside the preset angle range being longer than a preset duration, notifying the user to correct a bad posture based on a preset notifying manner.

3. The system of claim 2, wherein the at least one motion sensor comprises a 9-axis motion sensor; and
    the smart wearable device is further configured for converting raw sensing data of the at least one motion sensor into the posture data using a quaternion algorithm.

4. The system of claim 2, wherein the at least one motion sensor comprises a 9-axis motion sensor; and
    the smart wearable device is further configured for converting acceleration values in raw sensing data of the at least one motion sensor into pitch angles and roll angles in the posture data using an arctangent function.

5. The system of claim 2, wherein the posture data comprises yaw angles, pitch angles and roll angles, and at least one corresponding angular range is set for each type of the posture data; and
    wherein the smart wearable device is further configured for:
    comparing the yaw angles, the pitch angles and the roll angles with corresponding angle ranges of the yaw angles, the pitch angles and the roll angles, respectively; and
    notifying the user to correct the bad posture based on the preset notifying manner in response to a time duration of some or all of the yaw angles, the pitch angles and the roll angles being outside the corresponding angle ranges being longer than the preset duration.

6. The system of claim 2, wherein a preset client application program is installed on the monitoring terminal, and the preset reminder manner comprises:
    displaying a message for reminding the user to seek medical attention on an interactive interface of the preset client application program; or
    sending a message to a designated third-party terminal for reminding of a wearer of the smart wearable device needing the medical attention.

7. The system of claim 2, wherein a preset client application program is installed on the monitoring terminal;
    the monitoring terminal is further configured for: counting, in real time, a first time duration of the posture data falling into different preset threshold ranges within a preset real-time health monitoring period, and a second time duration of the posture data falling into the different preset threshold ranges within each of first preset time periods of the preset real-time health monitoring period, wherein the different preset threshold ranges indicate different health levels; and
    the monitoring terminal is further configured for: generating a first posture monitoring graph of the user based on the first time duration, generating a second posture monitoring graph of the user based on the second time duration, and displaying the first posture monitoring graph and the second posture monitoring graph on an interactive interface of the preset client application program, wherein the first posture monitoring graph is configured for representing a distribution of postures with the different health levels of the user within the preset real-time health monitoring period, and the second posture monitoring graph is configured for representing a distribution of the postures with the different health levels of the user within each of the first preset time periods of the preset real-time health monitoring period.

8. The system of claim 7, wherein the monitoring terminal is further configured for: in response to the detection of the user suffering from the head disease and/or the neck-shoulder disease, monitoring a recovery state of the user in real time, counting a third time duration of the user wearing the smart wearable device within each of second preset time periods of a preset recovery state monitoring period, comparing the posture data with a preset target value, obtaining a ratio of a fourth time duration of the posture data reaching the target value to a time duration of each of the second preset time periods within each of the second preset time periods, and determining a recovery trend based on the ratio and a difference between the posture data and the preset target value, wherein recovery trends comprise: maintaining, improving and declining; and
    the monitoring terminal is further configured for: generating a device wear time graph based on the third time duration, generating a posture recovery state graph based on the fourth time duration, displaying the device wear time graph and the posture recovery state graph on the interactive interface, wherein the posture recovery state graph comprises: the ratio, a preset target ratio, and description information of the recovery trend.

9. The system of claim 8, wherein the monitoring terminal is configured for transmitting posture data obtained during the preset recovery state monitoring period to a designated medical institution.

10. The system of claim 8, wherein the monitoring terminal is further configured for:
rating and scoring at least one posture of head and/or neck-shoulder of the user within each of preset third time periods of a preset posture rating period based on the posture data obtained in real time, preset standard posture data and a preset rating standard, and obtaining rating results and scoring results; and
generating a rating graph based on the rating results, generating a score changes graph based on the scoring results and a preset target score, and displaying the rating graph and the score changes graph on the interactive interface.

11. The system of claim 10, wherein the monitoring terminal is further configured for:
obtaining at least one value inputted by the user on the interactive interface, and sending a configuration instruction and the at least one value to the smart wearable device;
the smart wearable device is further configured for, in response to the configuration instruction sent by the monitoring terminal, setting the preset duration and/or the preset angle range according to the at least one value; and
the monitoring terminal is further configured for, in response to a preset action performed by the user on the interactive interface, performing at least one action corresponding to the preset action, wherein the at least one action comprises at least one of: controlling to turn on or off a posture monitoring, setting the preset target ratio, setting the reminder manner, setting the preset real-time health monitoring period, setting the preset recovery state monitoring period, setting the preset posture rating period, and setting a volume of a notifying voice.

12. The system of claim 2, wherein the system further comprises a cloud server;
the smart wearable device is further configured for transmitting raw sensing data of the at least one motion sensor to the monitoring terminal;
the monitoring terminal is further configured for transmitting monitoring data to the cloud server, wherein the monitoring data comprises: the raw sensing data, the posture data and account information of the user; and
the cloud server is configured for: storing the raw sensing data, the posture data and the account information of the user transmitted by the monitoring terminal, and associating the raw sensing data and the posture data with the account information of the user in cloud.

13. The system of claim 12, wherein the cloud server is further configured for: training all the posture data stored in the cloud periodically by using a preset supervised learning algorithm or a preset unsupervised learning algorithm, and obtaining a posture classification model;
the monitoring terminal is further configured for: in response to the monitoring terminal being online, obtaining the posture classification model from the cloud server, monitoring whether the user suffers from the head disease and/or the neck-shoulder disease based on the posture data and the obtained posture classification model, determining a category of a disease of the user, and obtaining exercise reminder information based on the category, wherein the preset reminder manner comprises: outputting the exercise reminder information based on a preset output manner; and
the monitoring terminal is further configured for: in response to the monitoring terminal being offline, monitoring whether the user suffers from the head disease and/or the neck-shoulder disease based on the posture data and a locally stored posture classification model, and determining the category of the disease of the user.

14. A smart wearable device, comprising: a processor, a memory, at least one motion sensor and a wireless communication device, wherein the memory, the at least one motion sensor and the wireless communication device are electrically coupled to the processor;
computer codes executable on the processor are stored on the memory, and when the computer codes are executed by the processor, the processor performs the following steps:
obtaining, by the at least one motion sensor, posture data of a head of a user in real time;
transmitting, by the wireless communication device, the posture data to a monitoring terminal or a cloud server; and
monitoring whether the user suffers from a head disease and/or a neck-shoulder disease based on the posture data, and in response to a detection of the user suffering from the head disease and/or the neck-shoulder disease, outputting a reminder message based on a preset reminder manner.

15. The smart wearable device of claim 14, wherein the steps further comprise:
comparing the posture data with a preset angle range, and notifying the user to correct a bad posture based on a preset notifying manner in response to a time duration of the posture data being outside the preset angle range being longer than a preset duration.

16. The smart wearable device of claim 14, wherein the at least one motion sensor comprises a 9-axis motion sensor, and the step of obtaining, by the at least one motion sensor, the posture data of the head of the user in real time comprises:
obtaining raw sensing data of the at least one motion sensor in real time, and converting the raw sensing data into the posture data using a quaternion algorithm.

17. The smart wearable device of claim 15, wherein the posture data comprises yaw angles, pitch angles and roll angles, and at least one corresponding angular range is set for each type of the posture data; and
the step of comparing the posture data with the preset angle range, and notifying the user to correct the bad posture based on the preset notifying manner in response to the time duration of the posture data being outside the preset angle range being longer than the preset duration comprises:
comparing the yaw angles, the pitch angles and the roll angles with corresponding angle ranges of the yaw angles, the pitch angles and the roll angles, respectively; and
notifying the user to correct the bad posture based on the preset notifying manner, in response to a time duration of some or all of the yaw angles, the pitch angles and the roll angles being outside the corresponding angle ranges being longer than the preset duration.

18. The smart wearable device of claim 15, wherein the smart wearable device further comprises a touch screen electrically coupled to the processor, and the step of outputting the reminder message based on the preset reminder manner comprises:
  displaying a message for reminding the user to seek medical attention on the touch screen; or
  sending, by the wireless communication device, a message to a designated third-party terminal for reminding of a wearer of the smart wearable device needing the medical attention.

19. The smart wearable device of claim 18, wherein the steps further comprise:
  counting, in real time, a first time duration of the posture data falling into different preset threshold ranges within a preset real-time health monitoring period, and a second time duration of the posture data falling into the different preset threshold ranges within each of first preset time periods of the preset real-time health monitoring period, wherein the different preset threshold ranges indicate different health levels; and
  generating a first posture monitoring graph of the user based on the first time duration, generating a second posture monitoring graph of the user based on the second time duration, and displaying the first posture monitoring graph and the second posture monitoring graph on the touch screen, wherein the first posture monitoring graph is configured for representing a distribution of postures with the different health levels of the user within the preset real-time health monitoring period, and the second posture monitoring graph is configured for representing a distribution of the postures with the different health levels of the user within each of the first preset time periods of the preset real-time health monitoring period.

20. The smart wearable device of claim 19, wherein the steps further comprise:
  in response to the detection of the user suffering from the head disease and/or the neck-shoulder disease, monitoring a recovery state of the user in real time, counting a third time duration of the user wearing the smart wearable device within each of second preset time periods of a preset recovery state monitoring period;
  comparing the posture data with a preset target value, obtaining a ratio of a fourth time duration of the posture data reaching the target value to a time duration of each of the second preset time periods within each of the second preset time periods, and determining a recovery trend based on the ratio and a difference between the posture data and the preset target value, wherein recovery trends comprise: maintaining, improving and declining;
  generating a device wear time graph based on the third time duration;
  generating a posture recovery state graph based on the fourth time duration; and
  displaying the device wear time graph and the posture recovery state graph on the touch screen, wherein the posture recovery state graph comprises: the ratio, a preset target ratio and description information of the recovery trend.

21. The smart wearable device of claim 20, wherein the steps further comprise:
  transmitting, by the wireless communication device, posture data obtained during the preset recovery state monitoring period to a designated medical institution.

22. The smart wearable device of claim 18, wherein the steps further comprise:
  rating and scoring at least one posture of head and/or neck-shoulder of the user within each of preset third time periods of a preset posture rating period based on the posture data obtained in real time, preset standard posture data and a preset rating standard, and obtaining rating results and scoring results;
  generating a rating graph based on the rating results, and generating a score changes graph based on the scoring results and a preset target score; and
  displaying the rating graph and the score changes graph on the touch screen.

23. The smart wearable device of claim 18, wherein the steps further comprise:
  in response to a preset action performed by the user on the touch screen, performing at least one action corresponding to the preset action, wherein the at least one action comprises at least one of: setting the preset duration and/or the preset angle range, controlling to turn on or off a posture monitoring, setting the preset target ratio, setting the reminder manner, setting the preset real-time health monitoring period, setting the preset recovery state monitoring period, setting the preset posture rating period, and setting a volume of a notifying voice.

24. The smart wearable device of claim 15, wherein the steps further comprise:
  transmitting, by the wireless communication device, monitoring data to the cloud server, wherein the monitoring data comprises: the raw sensing data, the posture data and account information of the user;
  wherein the step of monitoring whether the user suffers from the head disease and/or the neck-shoulder disease based on the posture data comprises:
  in response to the smart wearable device being offline, monitoring whether the user suffers from the head disease and/or the neck-shoulder disease based on the posture data and a posture classification model stored on the memory, and determining a category of a disease of the user; and
  in response to the smart wearable device being online, obtaining, by the wireless communication device, a posture classification model from the cloud server and storing the obtained posture classification model on the memory, monitoring whether the user suffers from the head disease and/or the neck-shoulder disease based on the posture data and the obtained posture classification model, and determining the category of the disease of the user; and
  obtaining exercise reminder information based on the category, wherein the posture classification model is obtained by the cloud server using a supervised learning algorithm or an unsupervised learning algorithm; and
  wherein the preset reminder manner comprises: outputting the exercise reminder information based on a preset output manner.

25. A method for user posture monitoring, comprising:
  obtaining, by a smart wearable device, posture data of a head of a user in real time using at least one motion sensor, and transmitting the posture data to a monitoring terminal; and
  monitoring, by the monitoring terminal, whether the user suffers from a head disease and/or a neck-shoulder disease based on the posture data, and in response to a detection of the user suffering from the head disease and/or the neck-shoulder disease, outputting a reminder message based on a preset reminder manner.

26. The method of claim 25, wherein the method further comprises:
   comparing, by the smart wearable device, the posture data with the preset angle range; and
   notifying, by the smart wearable device, the user to correct a bad posture based on a preset notifying manner in response to a time duration of the posture data being outside the preset angle range being longer than a preset duration.

27. The method of claim 26, wherein the at least one motion sensor comprises a 9-axis motion sensor, and the step of obtaining, by the smart wearable device, the posture data of the head of the user in real time using the at least one motion sensor comprises:
   obtaining, by the smart wearable device, raw sensing data of the at least one motion sensor in real time, and converting the raw sensing data into the posture data using a quaternion algorithm.

28. The method of claim 26, wherein the posture data comprises: yaw angles, pitch angles and roll angles, and at least one corresponding angular range is set for each type of the posture data; and
   wherein the step of comparing, by the smart wearable device, the posture data with the preset angle range, and notifying, by the smart wearable device, the user to correct the bad posture based on the preset notifying manner in response to the time duration of the posture data being outside the preset angle range being longer than the preset duration comprises:
   comparing, by the smart wearable device, the yaw angles, the pitch angles and the roll angles with corresponding angle ranges of the yaw angles, the pitch angles and the roll angles, respectively; and
   notifying, by the smart wearable device, the user to correct the bad posture based on the preset notifying manner, in response to a time duration of some or all of the yaw angles, the pitch angles and the roll angles being outside the corresponding angle ranges being longer than the preset duration.

29. The method of claim 26, wherein a preset client application program is installed on the monitoring terminal, and the step of outputting the reminder message based on the preset reminder manner comprises:
   displaying a message for reminding the user to seek medical attention on an interactive interface of the client application program; or
   sending a message to a designated third-party terminal for reminding of a wearer of the smart wearable device needing the medical attention.

30. The method of claim 26, wherein a preset client application program is installed on the monitoring terminal, and the method further comprises:
   counting, by the monitoring terminal, in real time, a first time duration of the posture data falling into different preset threshold ranges within a preset real-time health monitoring period, and a second time duration of the posture data falling into the different preset threshold ranges within each of first preset time periods of the preset real-time health monitoring period, wherein the different preset threshold ranges indicate different health levels; and
   generating, by the monitoring terminal, a first posture monitoring graph of the user based on the first time duration, generating a second posture monitoring graph of the user based on the second time duration, and displaying the first posture monitoring graph and the second posture monitoring graph on an interactive interface of the preset client application program, wherein the first posture monitoring graph is configured for representing a distribution of postures with the different health levels of the user within the preset real-time health monitoring period, and the second posture monitoring graph is configured for representing a distribution of the postures with the different health levels of the user within each of the first preset time periods of the preset real-time health monitoring period.

31. The method of claim 30, wherein the method further comprises:
   in response to the detection of the user suffering from the head disease and/or the neck-shoulder disease, monitoring, by the monitoring terminal, a recovery state of the user in real time, counting a third time duration of the user wearing the smart wearable device within each of second preset time periods of a preset recovery state monitoring period;
   comparing, by the monitoring terminal, the posture data with a preset target value, and obtaining a ratio of a fourth time duration of the posture data reaching the target value to a time duration of each of the second preset time periods within each of the second preset time periods;
   determining, by the monitoring terminal, a recovery trend based on the ratio and a difference between the posture data and the preset target value, wherein recovery trends comprise: maintaining, improving and declining;
   generating, by the monitoring terminal, a device wear time graph based on the third time duration, generating a posture recovery state graph based on the fourth time duration, and displaying the device wear time graph and the posture recovery state graph on the interactive interface, wherein the posture recovery state graph comprises:
   the ratio, a preset target ratio, and description information of the recovery trend.

32. The method of claim 31, wherein the method further comprises:
   transmitting, by the monitoring terminal, posture data obtained during the preset recovery state monitoring period to a designated medical institution.

33. The method of claim 31, wherein the method further comprises:
   rating and scoring, by the monitoring terminal, at least one posture of head and/or neck-shoulder of the user within each of preset third time periods of a preset posture rating period, based on the posture data obtained in real time, preset standard posture data and a preset rating standard, and obtaining rating results and scoring results; and
   generating, by the monitoring terminal, a rating graph based on the rating results, generating a score changes graph based on the scoring results and a preset target score, and displaying the rating graph and the score changes graph on the interactive interface.

34. The method of claim 33, wherein the method further comprises:
   obtaining, by the monitoring terminal, at least one value inputted by the user on the interactive interface, and sending a configuration instruction and the at least one value to the smart wearable device;

in response to the configuration instruction sent by the monitoring terminal, setting, by the smart wearable device, the preset duration and/or the preset angle range according to the at least one value; and in response to a preset action performed by the user on the interactive interface, performing, by the monitoring terminal, at least one action corresponding to the preset action, wherein the at least one action comprises at least one of: controlling to turn on or off a posture monitoring, setting the preset target ratio, setting the reminder manner, setting the preset real-time health monitoring period, setting the preset recovery state monitoring period, setting the preset posture rating period, and setting a volume of a notifying voice.

35. The method of claim 27, wherein the method further comprises:

transmitting, by the smart wearable device, the raw sensing data to the monitoring terminal;

transmitting, by the monitoring terminal, monitoring data to a cloud server, wherein the monitoring data comprises: the raw sensing data, the posture data and account information of the user; and storing, by the customer, the raw sensing data, the posture data and the account information of the user transmitted by the monitoring terminal, and associating the raw sensing data and the posture data with the account information of the user in cloud.

36. The method of claim 35, wherein the method further comprises:

training, by the cloud server, all the posture data stored in the cloud periodically using a preset supervised learning algorithm or a preset unsupervised learning algorithm, and obtaining a posture classification model;

wherein the step of monitoring, by the monitoring terminal, whether the user suffers from the head disease and/or shoulder and the neck diseases based on the posture data comprises:

in response to the monitoring terminal being offline, monitoring, by the monitoring terminal, whether the user suffers from the head disease and/or the neck-shoulder disease based on the posture data and a locally stored posture classification model, and determining a category of a disease of the user;

in response to the monitoring terminal being online, obtaining, by the monitoring terminal, a posture classification model from the cloud server, monitoring whether the user suffers from the head disease and/or the neck-shoulder disease based on the posture data and the obtained posture classification model, and determining the category of the disease of the user; and obtaining exercise reminder information based on the category; and wherein the preset reminder manner comprises: outputting the exercise reminder information based on a preset output manner.

* * * * *